US012648011B2

(12) United States Patent
Oh et al.

(10) Patent No.: US 12,648,011 B2
(45) Date of Patent: Jun. 2, 2026

(54) METHOD AND APPARATUS FOR DATA SCHEDULING IN WIRELESS COMMUNICATION SYSTEM

(71) Applicant: SAMSUNG ELECTRONICS CO., LTD., Suwon-si (KR)

(72) Inventors: Jinyoung Oh, Suwon-si (KR);
Taehyoung Kim, Suwon-si (KR);
Younsun Kim, Suwon-si (KR);
Hoondong Noh, Suwon-si (KR);
Hyoungju Ji, Suwon-si (KR)

(73) Assignee: Samsung Electronics Co., Ltd.,
Suwon-si (KR)

( * ) Notice: Subject to any disclaimer, the term of this patent is extended or adjusted under 35 U.S.C. 154(b) by 511 days.

(21) Appl. No.: 18/000,848

(22) PCT Filed: Jun. 30, 2021

(86) PCT No.: PCT/KR2021/008258
§ 371 (c)(1),
(2) Date: Dec. 6, 2022

(87) PCT Pub. No.: WO2022/005200
PCT Pub. Date: Jan. 6, 2022

(65) Prior Publication Data
US 2023/0217478 A1 Jul. 6, 2023

(30) Foreign Application Priority Data

| | | | |
|---|---|---|---|
| Jun. 30, 2020 | (KR) | .................. | 10-2020-0080642 |
| Aug. 6, 2020 | (KR) | .................. | 10-2020-0098547 |
| Sep. 11, 2020 | (KR) | .................. | 10-2020-0117008 |

(51) Int. Cl.
| | |
|---|---|
| *H04W 72/541* | (2023.01) |
| *H04L 1/00* | (2006.01) |
| *H04W 72/232* | (2023.01) |

(52) U.S. Cl.
CPC ......... *H04W 72/541* (2023.01); *H04L 1/0003* (2013.01); *H04W 72/232* (2023.01)

(58) Field of Classification Search
CPC .............. H04W 72/541; H04W 72/232; H04L 1/0003; H04L 1/0009; H04L 1/006; H04L 1/0025; H04L 5/0044
See application file for complete search history.

(56) References Cited

U.S. PATENT DOCUMENTS

| | | | |
|---|---|---|---|
| 7,933,238 B2 | 4/2011 | Sartori et al. | |
| 9,048,893 B1 * | 6/2015 | Sun ................... | H04L 25/03267 |

(Continued)

FOREIGN PATENT DOCUMENTS

| | | | |
|---|---|---|---|
| EP | 3567947 A1 | 11/2019 | |
| KR | 10-2009-0127130 A | 12/2009 | |

(Continued)

OTHER PUBLICATIONS

Supplementary European Search Report dated Sep. 7, 2023, in connection with European Patent Application No. 21832199.0, 9 pages.

(Continued)

*Primary Examiner* — Jay P Patel

(57) ABSTRACT

The present disclosure relates to: a communication technique for combining an IoT technology with a 5th generation (5G) or pre-5G communication system for supporting a higher data transmission rate than a 4th generation (4G) communication system such as long term evolution (LTE); and a system therefor. The present disclosure can be applied to intelligent services (for example, smart homes, smart buildings, smart cities, smart cars or connected cars, healthcare, digital education, retail businesses, security- and safety-related services, and the like) on the basis of a 5G communication technology and an IoT-related technology. According to an embodiment of the present disclosure, a (Continued)

method performed by a terminal of a communication system may: receive, from a base station, downlink control information including modulation and coding scheme (MCS) information and resource information of a data channel; acquire a first MCS index for a first resource included in resources of the data channel and a second MCS index for a second resource included in the resources of the data channel, on the basis of the MCS information and the resource information; and perform transmission or reception of the data channel on the basis of the acquired first MCS index and second MCS index.

16 Claims, 20 Drawing Sheets

(56)                    References Cited

U.S. PATENT DOCUMENTS

| | | | |
|---|---|---|---|
| 10,015,790 B2 | 7/2018 | Yang et al. | |
| 2010/0195614 A1* | 8/2010 | Nimbalker | H04L 1/0025 |
| | | | 370/330 |
| 2015/0312071 A1* | 10/2015 | Chen | H04L 1/0003 |
| | | | 370/329 |
| 2015/0358111 A1* | 12/2015 | Marinier | H04L 1/0026 |
| | | | 370/329 |
| 2016/0262054 A1* | 9/2016 | Singh | H04W 74/0808 |
| 2018/0287730 A1* | 10/2018 | Yamazaki | H04W 16/32 |
| 2018/0332597 A1* | 11/2018 | Li | H04L 27/362 |
| 2019/0158263 A1 | 5/2019 | Lee et al. | |
| 2019/0313348 A1* | 10/2019 | MolavianJazi | H04W 52/281 |
| 2019/0313426 A1* | 10/2019 | Lin | H04W 72/12 |
| 2020/0099467 A1 | 3/2020 | Wang et al. | |
| 2020/0153560 A1* | 5/2020 | Park | H04L 1/1822 |
| 2020/0186285 A1* | 6/2020 | Laddu | G06F 11/1048 |
| 2020/0313809 A1* | 10/2020 | Park | H04L 1/1861 |
| 2020/0413431 A1* | 12/2020 | Park | H04L 1/0009 |
| 2021/0022165 A1* | 1/2021 | Sun | H04L 1/1812 |
| 2021/0185718 A1* | 6/2021 | Ying | H04L 1/0061 |
| 2021/0211232 A1 | 7/2021 | Hwang et al. | |
| 2021/0212108 A1* | 7/2021 | Lou | H04L 1/189 |
| 2021/0274578 A1* | 9/2021 | Yum | H04L 1/0035 |
| 2021/0360705 A1* | 11/2021 | Oh | H04W 76/30 |
| 2021/0385809 A1* | 12/2021 | Kang | H04W 72/0453 |
| 2022/0124707 A1* | 4/2022 | Bae | H04W 72/0446 |
| 2022/0353021 A1* | 11/2022 | Park | H04L 1/1819 |
| 2022/0353711 A1* | 11/2022 | Ying | H04W 72/1263 |
| 2023/0140213 A1* | 5/2023 | Awadin | H04L 5/0044 |
| | | | 370/329 |
| 2023/0188261 A1* | 6/2023 | Awadin | H04L 1/08 |
| | | | 370/329 |
| 2023/0291505 A1* | 9/2023 | Park | H04L 1/1861 |

FOREIGN PATENT DOCUMENTS

| | | |
|---|---|---|
| KR | 10-2021-0043304 A | 4/2021 |
| WO | 2008109269 A2 | 9/2008 |
| WO | 2015163748 A1 | 10/2015 |
| WO | 2018174564 A1 | 9/2018 |
| WO | WO-2019225655 A1 * | 11/2019 |
| WO | 2021222774 A1 | 11/2021 |

OTHER PUBLICATIONS

ZTE et al., "Discussion on dynamic TDD and cross-link interference mitigation schemes", R1-1700270, 3GPP TSG RAN WG1 AH_NR#1 Meeting, Spokane, Washington, USA Jan. 16-20, 2016, 7 pages.
International Search Report and Written Opinion of the International Searching Authority dated Oct. 29, 2021, in connection with International Application No. PCT/KR2021/008258, 10 pages.
Office Action dated Jun. 24, 2025 in connection with European Patent Application No. 21 832 199.0 , 5 pages.
Office Action dated Sep. 29, 2025, in connection with Korean Application No. 10-2020-0117008, 9 pages.
Supplementary European Search Report dated Sep. 30, 2025, in connection with European Application No. 23852887.1, 8 pages.
Ericsson, "Increased No. of orthogonal DMRS ports," R1-2205112, 3GPP TSG-RAN WG1 Meeting #109-e, e-Meeting, May 9-20, 2022, 9 pages.
Samsung, "NR MIMO evolution for downlink and uplink," RP-221393, 3GPP TSG RAN Meeting #96, Budapest, Hungery, Jun. 6-9, 2022, 21 pages.

* cited by examiner control resource set #1 (401)

control resource set #2 (402)

FIG. 12B

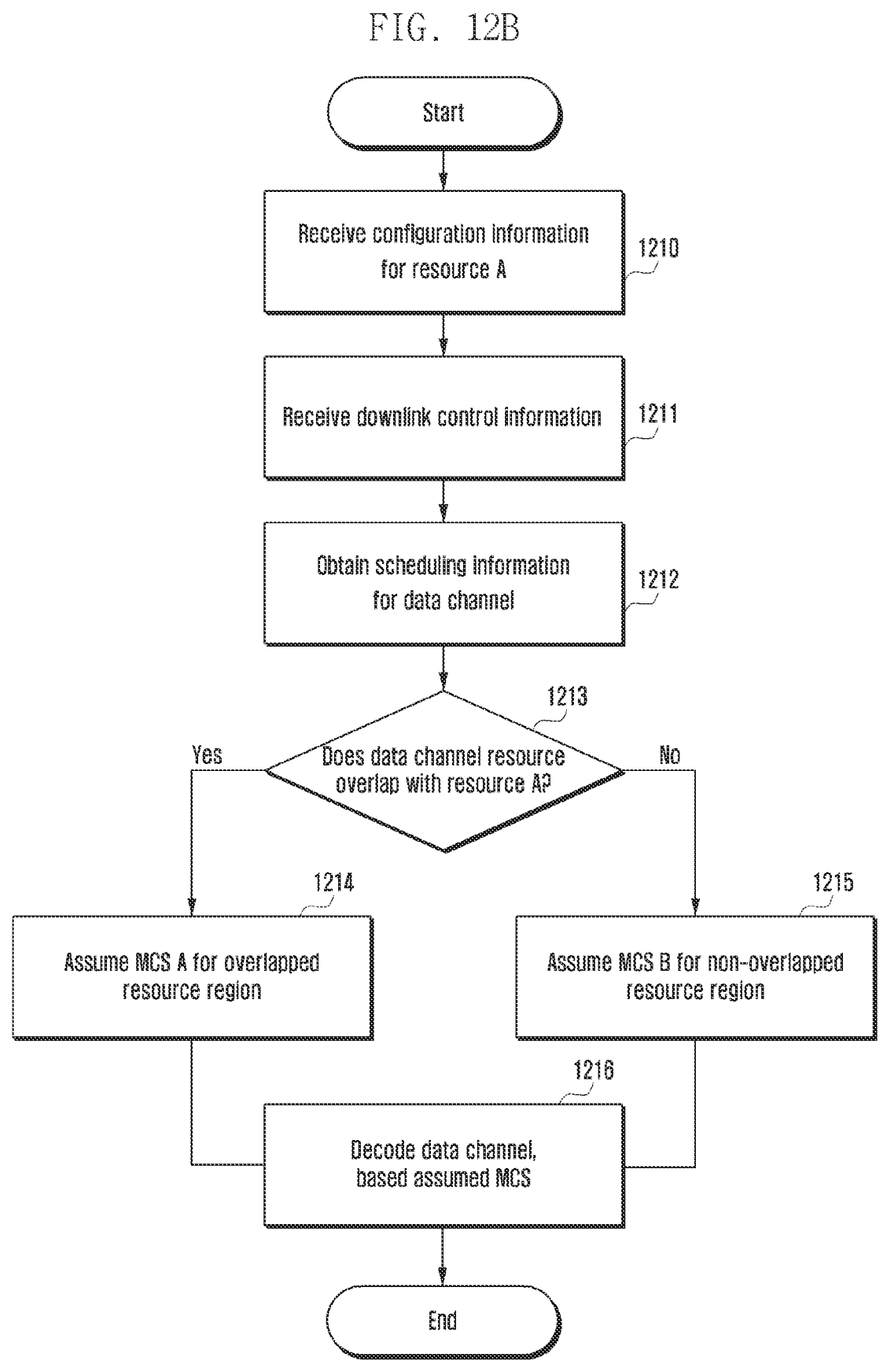

Start

Receive configuration information
for resource A — 1210

Receive downlink control information — 1211

Obtain scheduling information
for data channel — 1212

1213

Does data channel resource
overlap with resource A?

Yes

No

1214

Assume MCS A for overlapped
resource region

1215

Assume MCS B for non-overlapped
resource region

1216

Decode data channel,
based assumed MCS

End

METHOD AND APPARATUS FOR DATA SCHEDULING IN WIRELESS COMMUNICATION SYSTEM

CROSS-REFERENCE TO RELATED APPLICATIONS

This application is a 371 of International Application No. PCT/KR2021/008258 filed on Jun. 30, 2021, which claims priority to Korean Patent Application No. 10-2020-0080642 filed on Jun. 30, 2020, Korean Patent Application No. 10-2020-0098547 filed on Aug. 6, 2020, and Korean Patent Application No. 10-2020-0117008 filed on Sep. 11, 2020, the disclosures of which are herein incorporated by reference in their entirety.

BACKGROUND

1. Field

The disclosure relates to a method and an apparatus for signal transmission in an XDD system in a wireless communication system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a "beyond 4G network" communication system or a "post long term evolution (post LTE)" system. The 5G communication system is considered to be implemented in ultrahigh frequency (mmWave) bands (e.g., 60 GHz bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered an example of convergence of the 5G technology with the IoT technology.

With the advance of wireless communication systems as described above, various services can be provided, and accordingly there is a need for schemes to smoothly provide these services. In particular, research is being conducted on an XDD system for improving the coverages of a base station and a terminal.

SUMMARY

Disclosed embodiments are to solve the problem of different signal qualities caused by the effect of various interferences, the effect of fading channels, and the degradation of resource efficiency in parts of a time and frequency resource region in which a signal is to be transmitted or received in a wireless communication system.

The technical subjects pursued in the disclosure may not be limited to the above-mentioned technical subjects, and other technical subjects which are not mentioned may be clearly understood, through the following descriptions, by those skilled in the art to which the disclosure pertains.

In order to solve the problem described above, a method performed by a terminal of a communication system includes: receiving downlink control information including modulation and coding scheme (MCS) information and resource information of a data channel from a base station; obtaining a first MCS index for a first resource included in resources of the data channel and a second MCS index for a second resource included in the resources of the data channel, based on the MCS information and the resource information; and transmitting or receiving the data channel, based on the obtained first MCS index and the second MCS index.

In addition, a method performed by a base station of a communication system includes: identifying resources of a data channel; obtaining a first modulation and coding scheme (MCS) index for a first resource included in the resources of the data channel and a second MCS index for a second resource included in the resources of the data channel;

transmitting downlink control information based on the identified resources of the data channel, the first MCS index, and the second MCS index to a terminal; and receiving or transmitting the data channel, based on the first MCS index and the second MCS index, wherein the downlink control information includes resource information of the data channel and MCS information.

In addition, a terminal of a communication system includes; a transceiver; and a controller configured to perform control to receive downlink control information including modulation and coding scheme (MCS) information and resource information of a data channel from a base station, obtain a first MCS index for a first resource included in resources of the data channel and a second MCS index for a second resource included in the resources of the data channel, based on the MCS information and the resource information, and transmit or receive the data channel, based on the obtained first MCS index and the second MCS index.

In addition, a base station of a communication system includes: a transceiver; and a controller configured to perform control to identify resources of a data channel, obtain a first modulation and coding scheme (MCS) index for a first resource included in the resources of the data channel and a second MCS index for a second resource included in the resources of the data channel, transmit downlink control information based on the identified resources of the data channel, the first MCS index, and the second MCS index to a terminal, and receive or transmit the data channel, based on the first MCS index and the second MCS index, wherein the downlink control information includes resource information of the data channel and MCS information.

The disclosed embodiments provide a communication method and apparatus enabling effective data scheduling in a wireless communication system so as to solve the problem of different signal qualities caused by the effect of various interferences, the effect of fading channels, and the degradation of resource efficiency in parts of a time and frequency resource region in which a signal is to be transmitted or received.

Advantageous effects obtainable from the disclosure may not be limited to the above-mentioned effects, and other effects which are not mentioned may be clearly understood, through the following descriptions, by those skilled in the art to which the disclosure pertains.

BRIEF DESCRIPTION OF THE DRAWINGS

FIG. 12B illustrates a terminal operation according to an embodiment of the disclosure;

FIG. 13B illustrates a terminal procedure according to an embodiment of the disclosure;

DETAILED DESCRIPTION

Figure 1:
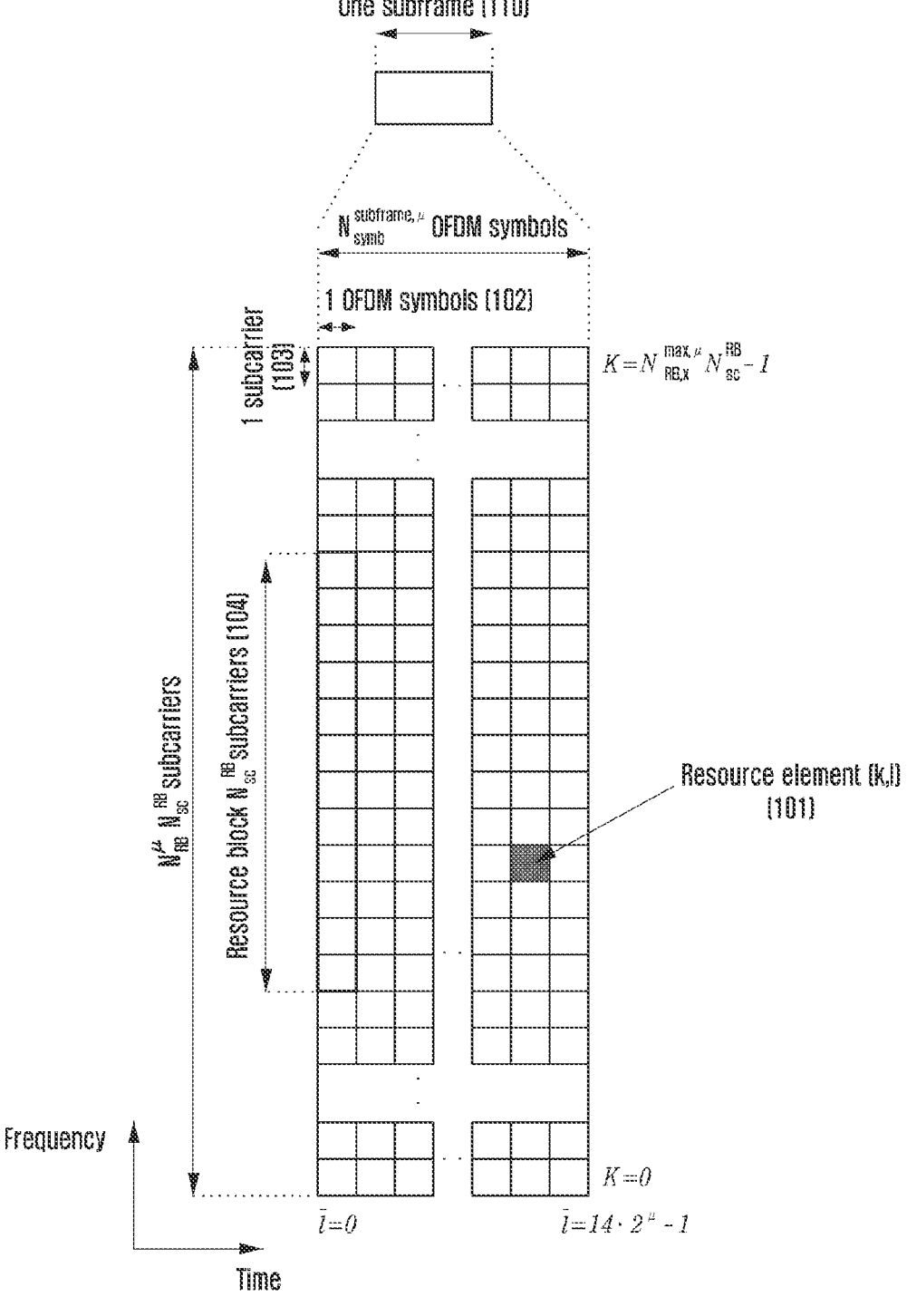
FIG. 1 illustrates a basic structure of a time-frequency domain that is a wireless resource region in which data or a control channel is transmitted in a 5G wireless communication system according to an embodiment of the disclosure.

Hereinafter, embodiments of the disclosure will be described in detail with reference to the accompanying drawings.

In describing the embodiments, descriptions related to technical contents well-known in the art to which the disclosure pertains and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. Further, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. In the disclosure, a "downlink (DL)" refers to a radio link via which a base station transmits a signal to a terminal, and an "uplink (UL)" refers to a radio link via which a terminal transmits a signal to a base station. Further, in the following description, LTE or LTE-A systems may be described by way of example, but the embodiments of the disclosure may also be applied to other communication systems having similar technical backgrounds or channel types. Examples of such communication systems may include 5th generation mobile communication technologies (5G, new radio, and NR) developed beyond LTE-A, and in the following description, the "5G" may be the concept that covers the exiting LTE, LTE-A, or other similar services. In addition, based on determinations by those skilled in the art, the embodiments of the disclosure may also be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in embodiments of the disclosure, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, in the embodiments, the "unit" may include one or more processors.

A wireless communication system is advancing to a broadband wireless communication system for providing high-speed and high-quality packet data services using communication standards, such as high-speed packet access (HSPA) of 3GPP, LTE {long-term evolution or evolved universal terrestrial radio access (E-UTRA)}, LTE-Advanced (LTE-A), LTE-Pro, high-rate packet data (HRPD) of 3GPP2, ultra-mobile broadband (UMB), IEEE 802.16e, and the like, as well as typical voice-based services.

As a typical example of the broadband wireless communication system, an LTE system employs an orthogonal frequency division multiplexing (OFDM) scheme in a downlink (DL) and employs a single carrier frequency division multiple access (SC-FDMA) scheme in an uplink (UL). The uplink indicates a radio link through which a user equipment (UE) {or a mobile station (MS)} transmits data or control signals to a base station (BS) (eNode B), and the downlink indicates a radio link through which the base station transmits data or control signals to the UE. The above multiple access scheme may separate data or control information of respective users by allocating and operating time-frequency resources for transmitting the data or control information for each user so as to avoid overlapping each other, that is, so as to establish orthogonality.

Since a 5G communication system, which is a post-LTE communication system, must freely reflect various requirements of users, service providers, and the like, services satisfying various requirements must be supported. The services considered in the 5G communication system include enhanced mobile broadband (eMBB) communication, massive machine-type communication (mMTC), ultra-reliability low-latency communication (URLLC), and the like.

eMBB aims at providing a data rate higher than that supported by existing LTE, LTE-A, or LTE-Pro. For example, in the 5G communication system, eMBB must provide a peak data rate of 20 Gbps in the downlink and a peak data rate of 10 Gbps in the uplink for a single base station. Furthermore, the 5G communication system must provide an increased user-perceived data rate to the UE, as well as the maximum data rate. In order to satisfy such requirements, transmission/reception technologies including a further enhanced multi-input multi-output (MIMO) transmission technique are required to be improved. In addition, the data rate required for the 5G communication system may be obtained using a frequency bandwidth more than 20 MHz in a frequency band of 3 to 6 GHz or 6 GHz or more, instead of transmitting signals using a transmission bandwidth up to 20 MHz in a band of 2 GHz used in LTE.

In addition, mMTC is being considered to support application services such as the Internet of Things (IoT) in the 5G communication system. mMTC has requirements, such as support of connection of a large number of UEs in a cell, enhancement coverage of UEs, improved battery time, a reduction in the cost of a UE, and the like, in order to effectively provide the Internet of Things. Since the Internet of Things provides communication functions while being provided to various sensors and various devices, it must support a large number of UEs (e.g., 1,000,000 UEs/km2) in a cell. In addition, the UEs supporting mMTC may require wider coverage than those of other services provided by the 5G communication system because the UEs are likely to be located in a shadow area, such as a basement of a building, which is not covered by the cell due to the nature of the service. The UE supporting mMTC must be configured to be inexpensive, and may require a very long battery life-time, such as 10-15 years, because it is difficult to frequently replace the battery of the UE.

Lastly, URLLC, which is a cellular-based mission-critical wireless communication service, may be used for remote control for robots or machines, industrial automation, unmanned aerial vehicles, remote health care, emergency alert, and the like. Thus, URLLC must provide communication with ultra-low latency and ultra-high reliability. For example, a service supporting URLLC must satisfy an air interface latency of less than 0.5 ms, and also requires a packet error rate of 10-5 or less. Therefore, for the services supporting URLLC, a 5G system must provide a transmit time interval (TTI) shorter than those of other services, and also may require a design for assigning a large number of resources in a frequency band in order to secure reliability of a communication link.

Three services in 5G, that is, eMBB, URLLC, and mMTC, may be multiplexed and transmitted in a single system. In this case, different transmission/reception techniques and transmission/reception parameters may be used between services in order to satisfy different requirements of the respective services. Of course, 5G is not limited to the three services described above.

Hereinafter, a frame structure of a 5G system will be described in detail with reference to the drawings.

FIG. 1 illustrates a basic structure of a time-frequency domain that is a wireless resource region in which data or a control channel is transmitted in a 5G wireless communication system according to an embodiment of the disclosure.

Referring to FIG. 1, the transverse axis indicates a time domain, and the longitudinal axis indicates a frequency domain. In the time-frequency domain, a basic unit of a resource is a resource element (RE) 101, and may be defined by one orthogonal frequency division multiplexing (OFDM) symbol 102 in a time axis and one subcarrier 103 in a frequency axis. In the frequency domain, $$N_{sc}^{RB}$$

number (e.g., 12) of consecutive REs may configure one resource block (RB) 104.

Figure 2:
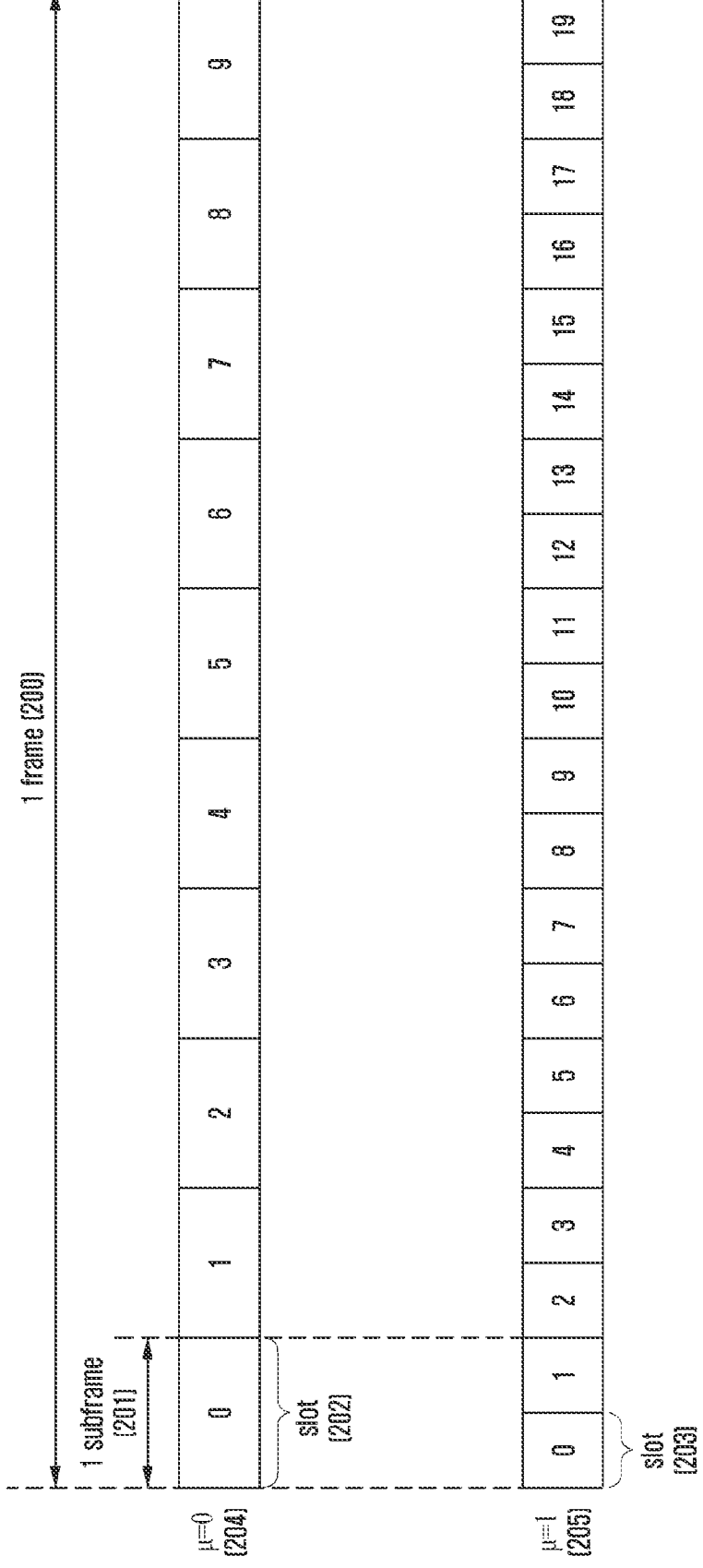
FIG. 2 illustrates an example of a slot structure used in a 5G wireless communication system according to an embodiment of the disclosure.

FIG. 2 illustrates an example of a slot structure used in a 5G wireless communication system according to an embodiment of the disclosure.

Referring to FIG. 2, an example of a structure of a frame 200, a subframe 201, and a slot 202 is illustrated. One frame 200 may be defined as 10 ms. One subframe 201 may be defined as 1 ms, and thus one frame 200 may be configured by a total of 10 subframes 201. One slot 202 or 203 may be defined as 14 OFDM symbols (i.e., the number $$\left(N_{symb}^{slot}\right)$$

of symbols per one slot=14). One subframe 201 may be configured by one slot 202 or a plurality of slots 203, and the number of slots 202 or 203 per one subframe 201 may be different according to a configuration value $\mu$ 204 or 205 of subcarrier spacing. FIG. 2 illustrates an example in which a subcarrier spacing configuration value $\mu$ is 0 (the case indicated by reference numeral 204), and a subcarrier spacing configuration value $\mu$ is 1 (the case indicated by reference numeral 205). In case that $\mu$ is 0 ($\mu$=0, 204), one subframe 201 may be configured by one slot 202, and in case that $\mu$ is 1 ($\mu$=1, 205), one subframe 201 may be configured by two slots 203. That is, the number $$\left(N_{slot}^{subframe,\mu}\right)$$

of slots per one subframe may vary according to a configuration value $\mu$ of a subcarrier spacing, and the number $$\left(N_{slot}^{frame,\mu}\right)$$

of slots per one frame may vary accordingly.

$$N_{slot}^{subframe,\mu}$$

and $$N_{slot}^{frame,\mu}$$

according to each subcarrier spacing configuration p may be defined as shown below in Table 1.

TABLE 1

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Next, a bandwidth part (BWP) configuration in a 5G communication system will be described in detail with reference to the drawings.

Figure 3:
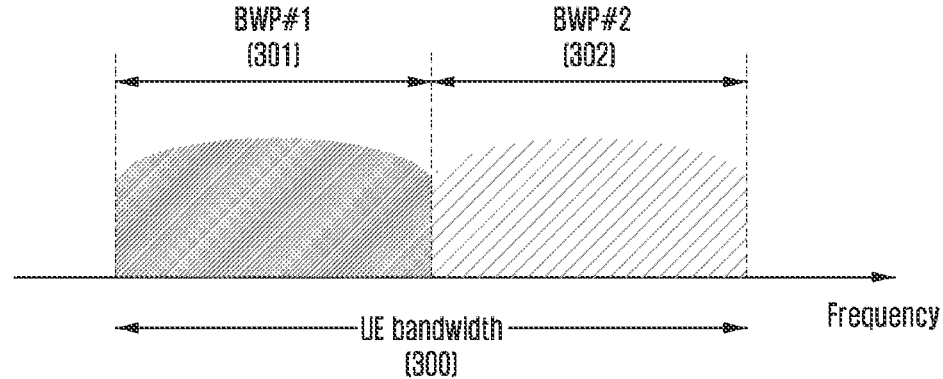
FIG. 3 illustrates an example of a configuration for a bandwidth part (BWP) of a 5G wireless communication system according to an embodiment of the disclosure.

FIG. 3 illustrates an example of a configuration for a bandwidth part (BWP) of a 5G wireless communication system according to an embodiment of the disclosure.

Referring to FIG. 3, an example in which a terminal bandwidth (UE bandwidth) 300 is configured by two bandwidth parts, that is, bandwidth part #1 (BWP #1) 301 and bandwidth part #2 (BWP #2) 302 is illustrated. A base station may configure one bandwidth part or a plurality of bandwidth parts for a terminal and may configure pieces of information as shown in Table 2 below for each bandwidth part.

TABLE 2

| BWP ::= | SEQUENCE { |
| --- | --- |
| bwp-Id | BWP-Id, |
| (Bandwidth part identifier) | |
| locationAndBandwidth | INTEGER (1. .65536), |
| (Bandwidth part location) | |
| subcarrierSpacing | ENUMERATED {n0, n1, n2, n3, n4, n5}, |
| (Subcarrier spacing) | |
| cyclicPrefix | ENUMERATED { extended } |
| (Cyclic prefix) | |
| } | |

However, a configuration for a bandwidth is not limited to the above example. In addition to the pieces of configuration information described above, various parameters related to a bandwidth part may be configured for the terminal. The pieces of configuration information may be transferred by the base station to the terminal through higher layer signaling, for example, radio resource control (RRC) signaling. At least one bandwidth part among the configured one bandwidth part or multiple bandwidth parts may be activated. Whether the configured bandwidth part is activated may be semi-statically transmitted from the base station to the terminal through RRC signaling, or dynamically transmitted through downlink control information (DCI).

According to an embodiment, an initial bandwidth part (BWP) for initial access may be configured by the base station for the terminal before a radio resource control (RRC) connection through a master information block (MIB). More specifically, the terminal may receive, through an MIB and in an initial access stage, configuration information on a control resource set (CORESET) and a search space in which a PDCCH may be transmitted, the PDCCH being designed for reception of system information (this may correspond to remaining system information (RMSI) or system information block 1 (SIB1)) required for initial access. Each of the control resource set and the search space configured through the MIB may be considered as identifier (identity, ID) 0. The base station may notify, through the MIB, the terminal of configuration information, such as frequency allocation information, time allocation information, and numerology for control resource set #0. In addition, the base station may notify, through the MIB, the terminal of configuration information on a monitoring period and a monitoring occasion for control resource set #0, that is, configuration information on search space #0. The terminal may consider a frequency region configured to be control resource set #0 obtained from the MIB, as an initial bandwidth part for initial access. The identifier (ID) of the initial bandwidth part may be considered to be 0.

A configuration for a bandwidth part supported in a 5G wireless communication system may be used for various purposes.

According to an embodiment, in case that a bandwidth supported by a terminal is smaller than a system bandwidth, the configuration for the bandwidth part may be used. For example, a base station may configure the frequency location (configuration information 2) of a bandwidth part for a terminal so that the terminal transmits or receives data at a particular frequency location in a system bandwidth.

In addition, according to an embodiment, a base station may configure a plurality of bandwidth parts for a terminal in order to support different numerologies. For example, in order to support, to a terminal, both data transmission/reception using a subcarrier spacing of 15 kHz and data transmission/reception using a subcarrier spacing of 30 kHz, a base station may configure two bandwidth parts having a subcarrier spacing of 15 kHz and a subcarrier spacing of 30 kHz, respectively. Different bandwidth parts may be frequency-division-multiplexed, and in case that the base station is to transmit or receive data using a particular subcarrier spacing, a bandwidth part configured to have the subcarrier spacing may be activated.

In addition, according to an embodiment, a base station may configure bandwidth parts having different sizes of bandwidths for a terminal in order to reduce the power consumption of the terminal. For example, in case that the terminal supports a very wide bandwidth, for example, a bandwidth of 100 MHz, and always transmits or receives data through the bandwidth, the terminal may consume a very large quantity of power. Particularly, unnecessary monitoring of a downlink control channel in a large bandwidth of 100 MHz under no traffic may be very inefficient in view of power consumption. In order to reduce the power consumption of the terminal, the base station may configure a bandwidth part having a relatively small bandwidth, for example, a bandwidth part having 20 MHz for the terminal. Under no traffic, the terminal may perform a monitoring operation in a 20 MHz bandwidth part, and in case that data is generated, the terminal may transmit or receive the data in a 100 MHz bandwidth part according to an indication of the base station.

In relation to a method for configuring a bandwidth part, terminals before RRC-connected may receive configuration information on an initial bandwidth part through a master information block (MIB) in an initial access stage. More specifically, a control resource set (CORESET) for a downlink control channel through which downlink control information (DCI) scheduling a system information block (SIB) is able to be transmitted may be configured for a terminal from an MIB of a physical broadcast channel (PBCH). The bandwidth of the control resource set configured by the MIB may be considered as an initial bandwidth part, and the terminal may receive a physical downlink shared channel (PDSCH) through which an SIB is transmitted, through the configured initial bandwidth part. The initial bandwidth part may also be used for other system information (OSI), paging, and random access in addition to the reception of an SIB.

In case that one or more bandwidth parts are configured for a terminal, a base station may indicate the terminal to change a bandwidth part, by using a bandwidth part indicator field in DCI. For example, in FIG. 3, in case that a currently activated bandwidth part of a terminal is bandwidth part #1 301, a base station may indicate bandwidth part #2 302 for the terminal through a bandwidth part indicator field in DCI, and the terminal may change the bandwidth part to bandwidth part #2 302 indicated by the bandwidth part indicator field in the received DCI.

As described above, bandwidth part change based on DCI may be indicated by DCI scheduling a PDSCH or a PUSCH, and thus in case that a terminal receives a request to change the bandwidth part, the terminal is required to be able to smoothly transmit or receive a PDSCH or PUSCH scheduled by corresponding DCI in a changed bandwidth part. To this end, a standard prescribes requirements for a latency time (TBWP) required for bandwidth part change, and the requirements may be defined, for example, as shown in Table 3 below.

TABLE 3

| | NR Slot length | BWP switch delay $T_{BWP}$ (slots) | |
| μ | (ms) | Type 1[Note 1] | Type 2[Note 1] |
| --- | --- | --- | --- |
| 0 | 1 | [1] | [3] |
| 1 | 0.5 | [2] | [5] |
| 2 | 0.25 | [3] | [9] |
| 3 | 0.125 | [6] | [17] |

[Note 1]Depends on UE capability.

Note 2

If the BWP switch involves changing of SCS, the BWP switch delay is determined by the larger one between the SCS before BWP switch and the SCS after BWP switch.

The requirements for a latency time for bandwidth part change may support type 1 or type 2 according to the capability of a terminal. A terminal may report a supportable type of bandwidth part latency time to a base station. According to the above requirements for a latency time for bandwidth part change, in case that a terminal receives DCI including a bandwidth part change indicator in slot n, the terminal may complete changing to a new bandwidth part indicated by the bandwidth part change indicator at a time point not later than slot n+TBWP, and transmit or receive a data channel scheduled by the DCI in the changed new bandwidth part. In case that a base station is to schedule a data channel in a new bandwidth part, the base station may determine a time domain resource allocation for the data channel in consideration of a bandwidth part change latency time (TBWP) of a terminal. That is, when the base station schedules a data channel in a new bandwidth part, in a method of determining a time domain resource allocation for the data channel, the base station may schedule the data channel after a bandwidth part change latency time. Accordingly, a terminal may not expect that DCI indicating to change the bandwidth part indicates a slot offset (K0 or K2) value smaller than a bandwidth part change latency time (TBWP).

If a terminal has received DCI (e.g., DCI format 1_1 or 0_1) indicating to change the bandwidth part, the terminal may not perform any transmission or reception for a time interval from the third symbol of a slot receiving a PDCCH including the DCI to the starting point of a slot indicated by a slot offset (K0 or K2) value indicated by a time domain resource allocation indicator field in the DCI. For example, if a terminal has received a DCI indicating to change the bandwidth part in slot n, and a slot offset value indicated by the DCI is K, the terminal may not perform any transmission or reception during a time interval from the third symbol of slot n to the symbol before slot n+K (i.e., the last symbol of slot n+K−1).

Next, a synchronization signal (SS)/PBCH block in a 5G wireless communication system will be described.

An SS/PBCH block may denote a physical layer channel block configured by a primary synchronization signal (PSS), a secondary synchronization signal (SSS), and a PBCH. Specifically, the SS/PBCH block may be as follows.

PSS: A PSS is a signal serving as a criterion of downlink time/frequency synchronization, and provides partial information of a cell ID.

SSS: An SSS is a signal serving as a criterion of downlink time/frequency synchronization, and provides the remaining cell ID information which is not provided by a PSS. Additionally, this signal may serve as a reference signal for demodulation of a PBCH.

PBCH: A PBCH provides essential system information required for transmission/reception for a data channel and a control channel of a terminal. The essential system information may include search space-related control information indicating wireless resource mapping information of a control channel, and scheduling control information relating to a separate data channel through which system information is transmitted.

SS/PBCH block: An SS/PBCH block is configured by a combination of a PSS, an SSS, and a PBCH. One or a plurality of SS/PBCH blocks may be transmitted within a time of 5 ms, and each of the transmitted SS/PBCH blocks may be distinguished by index.

A terminal may detect a PSS and an SSS in an initial access stage, and may decode a PBCH. The terminal may obtain an MIB from the PBCH, and control resource set (CORESET) #0 (this may correspond to a control resource set having a control resource set index of 0) may be configured for the terminal from the MIB. The terminal may monitor control resource set #0 under the assumption that a selected SS/PBCH block and a demodulation reference signal (DMRS) transmitted in control resource set #0 are quasi-co-located (QCLed). The terminal may receive system information through downlink control information transmitted in control resource set #0. The terminal may obtain configuration information related to a random access channel (RACH) required for initial access from the received system information. The terminal may transmit a physical RACH (PRACH) to the base station in consideration of the selected SS/PBCH index, and the base station having received the PRACH may obtain information on the SS/PBCH block index selected by the terminal. The base station may recognize which SS/PBCH block the terminal has selected among SS/PBCH blocks, and the terminal monitoring control resource set #0 associated with the selected SS/PBCH block.

Next, downlink control information (DCI) in a 5G wireless communication system will be explained in detail.

In a 5G system, scheduling information on uplink data (or physical uplink data channel (physical uplink shared channel, PUSCH)) or downlink data (or physical downlink data channel (physical downlink shared channel, PDSCH)) is transferred through DCI from a base station to a terminal. A terminal may monitor a fallback DCI format and a non-fallback DCI format for a PUSCH or a PDSCH. The fallback DCI format may be configured by a fixed field pre-defined between a base station and a terminal, and the non-fallback DCI format may include a configurable field.

DCI may undergo a channel coding and modulation process, and then be transmitted through a physical downlink control channel (PDCCH). A cyclic redundancy check (CRC) may be attached to a DCI message payload, and the CRC may be scrambled by a radio network temporary identifier (RNTI) corresponding to the identity of a terminal. Different RNTIs may be used according to the purpose of a DCI message, for example, terminal (UE)-specific data transmission, a power control command, a random access response, or the like. That is, an RNTI is not explicitly transmitted, and is transmitted after being included in a CRC calculation process. If a terminal has received a DCI message transmitted on a PDCCH, the terminal may identify a CRC by using an assigned RNTI, and if a CRC identification result is correct, the terminal may identify that the message has been transmitted to the terminal.

For example, DCI scheduling a PDSCH for system information (SI) may be scrambled by an SI-RNTI. DCI scheduling a PDSCH for a random access response (RAR) message may be scrambled by an RA-RNTI. DCI scheduling a PDSCH for a paging message may be scrambled by a P-RNTI. DCI notifying of a slot format indicator (SFI) may be scrambled by an SFI-RNTI. DCI notifying of a transmit power control (TPC) may be scrambled by a TPC-RNTI. DCI scheduling a terminal-specific PDSCH or PUSCH may be scrambled by a cell RNTI (C-RNTI), a modulation coding scheme C-RNTI (MCS-C-RNTI), or a configured scheduling RNTI (CS-RNTI).

DCI format 0_0 may be used as fallback DCI scheduling a PUSCH, and in this case, a CRC may be scrambled by a C-RNTI. DCI format 0_0 having a CRC scrambled by a C-RNTI may include, for example, pieces of information as shown in Table 4 below.

TABLE 4

---

Identifier for DCI formats (DCI format identifier) - 1 bit
The value of this bit field is always set to 0, indicating an UL DCI format
Frequency domain resource assignment -

$$\left\lceil \log_2\left(N_{RB}^{UL,BWP}\left(N_{RB}^{UL,BWP}+1\right)/2\right)\right\rceil \quad \text{bits where}$$

$N_{RB}^{UL,BWP}$     is defined in subclause 7.3.1.0

For PUSCH hopping with resource allocation type 1:
$N_{UL\_hop}$ MSB bits are used to indicate the frequency offset according to
Subclause 6.3 of [6, TS 38.214], where $N_{UL\_hop}$ = 1 if the higher layer parameter
frequencyHoppingOffsetLists contains two offset values and $N_{UL\_hop}$ = 2 if the higher
layer parameter frequencyHoppingOffsetLists contains four offset values $$\left\lceil \log_2\left(N_{RB}^{UL,BWP}\left(N_{RB}^{UL,BWP}+1\right)/2\right)\right\rceil - N_{UL\_hop} \quad \text{bits provides the frequency domain}$$

resource allocation according to Subclause 6.1.2.2.2 of [6, TS 38.214]
For non-PUSCH hopping with resource allocation type 1:

$$\left\lceil \log_2\left(N_{RB}^{UL,BWP}\left(N_{RB}^{UL,BWP}+1\right)/2\right)\right\rceil \quad \text{bits provides the frequency domain resource}$$

allocation according to Subclause 6.1.2.2.2 of [6, TS 38.214]
Time domain resource assignment - 4 bits as defined in Subclause 6.1.2.1 of [6, TS
38.214]
Frequency hopping flag - 1 bit according to Table 7.3.1.1.1-3, as defined in
Subclause 6.3 of [6, TS 38.214]
Modulation and coding scheme - 5 bits as defined in Subclause 6.1.4.1 of [6, TS
38.214]
New data indicator - 1 bit
Redundancy version - 2 bits as defined in Table 7.3.1.1.1-2
HARQ process number - 4 bits
Transmit power control (TPC) command for scheduled PUSCH - 2 bits as defined
in Subclause 7.1.1 of [5, TS 38.213]
Padding bits, if required.
Uplink/Supplementary uplink indicator (UL/SUL indicator) - 1 bit for UEs
configured with supplementaryUplink in ServingCellConfig in the cell as defined
in Table 7.3.1.1.1-1 and the number of bits for DCI format 1_0 before padding is
larger than the number of bits for DCI format 0_0 before padding; 0 bit otherwise.
The UL/SUL indicator, if present, locates in the last bit position of DCI format
0_0, after the padding bit(s).
If the UL/SUL indicator is present in DCI format 0_0 and the higher layer
parameter pusch-Config is not configured on both UL and SUL the UE ignores the
UL/SUL indicator field in DCI format 0_0, and the corresponding PUSCH
scheduled by the DCI format 0_0 is for the UL or SUL for which high layer
parameter pucch-Config is configured;
If the UL/SUL indicator is not present in DCI format 0_0 and pucch-Config is
configured, the corresponding PUSCH scheduled by the DCI format 0_0 is for the
UL or SUL for which high layer parameter pucch-Config is configured.
-      If the UL/SUL indicator is not present in DCI format 0_0 and pucch-
Config is not configured, the corresponding PUSCH scheduled by the DCI format
0_0 is for the uplink on which the latest PRACH is transmitted.

---

DCI format 0_1 may be used as non-fallback DCI scheduling a PUSCH, and in this case, a CRC may be scrambled by a C-RNTI. DCI format 0_1 having a CRC scrambled by a C-RNTI may include, for example, pieces of information as shown in Table 5 below.

TABLE 5

Identifier for DCI formats - 1 bit
The value of this bit field is always set to 0, indicating an UL DCI format
Carrier indicator - 0 or 3 bits, as defined in Subclause 10.1 of
[5, TS38.213] . UL/SUL indicator - 0 bit for UEs not configured with
supplementary Uplink in ServingCellConfig in the cell or UEs configured
with supplementaryUplink in ServingCellConfig in the cell but only
PUCCH carrier in the cell is configured for PUSCH transmission;
otherwise, 1 bit as defined in Table 7.3.1.1.1-1. Bandwidth part
indicator - 0, 1 or 2 bits as determined by the number of UL
BWPs $n_{BWP,RRC}$ configured by higher layers, excluding the initial UL
bandwidth part. The bitwidth for this field is determined as
$\lceil \log_2(n_{BWP}) \rceil$ bits, where $n_{BWP} = n_{BWP,RRC} + 1$ if $n_{BWP,RRC} \leq 3$, in which
case the bandwidth part indicator is equivalent to the ascending order
of the higher layer parameter BWP-Id; otherwise $n_{BWP} = n_{BWP,RRC}$,
in which case the bandwidth part indicator is defined in
Table 7.3.1.1.2-1; If a UE does not support active BWP change
via DCI, the UE ignores this bit field. Frequency domain resource
assignment - number of bits determined by the following,
where $N_{RB}^{UL,BWP}$ is the size of the active UL bandwidth part:
$N_{RBG}$ bits if only resource allocation type 0 is configured, where is defined
in Subclause 6.1.2.2.1 of [6, TS 38.214],
$\lceil \log_2(N_{RB}^{UL,BWP}(N_{RB}^{UL,BWP} + 1)/2) \rceil$ bits if only resource allocation type 1
is configured, or $\max(\lceil \log_2(N_{RB}^{UL,BWP}(N_{RB}^{UL,BWP} + 1)/2) \rceil, N_{RBG}) + 1$
bits
if both resource allocation type 0 and 1 are configured.
If both resource allocation type 0 and 1 are configured, the MSB bit is
used to indicate resource allocation type 0 or resource allocation type 1,
where the bit value of 0 indicates resource allocation type 0 and the bit
value of 1 indicates resource allocation type 1.
For resource allocation type 0, the $N_{RBG}$ LSBs provide the resource
allocation as defined in Subclause 6.1.2.2. 1 of [6, TS 38.214].
For resource allocation type 1, the $\lceil \log_2(N_{RB}^{UL,BWP}(N_{RB}^{UL,BWP} + 1)/2) \rceil$
LSBs provide the resource allocation as follows:
For PUSCH hopping with resource allocation type 1:
$N_{UL\_hop}$ MSB bits are used to indicate the frequency offset according to
Subclause 6.3 of [6, TS .38.214], where $N_{UL\_hop} = 1$ if the higher layer
parameter frequencyHoppingOffsetLists contains two offset values and
$N_{UL\_hop} = 2$ if the higher layer parameter frequencyHoppingOffsetLists
contains four offset values $\lceil \log_2(N_{RB}^{UL,BWP}(N_{RB}^{UL,BWP} + 1)/2 \rceil - N_{UL\_hop}$
bits provides the frequency domain resource allocation according to
Subclause 6.1.2.2.2 of [6, TS 38.214]
For non-PUSCH hopping with resource allocation type 1:
$\lceil \log_2(N_{RB}^{UL,BWP}(N_{RB}^{UL,BWP} + 1)/2) \rceil$ bits provides the frequency domain
resource allocation according to Subclause 6.1.2.2.2 of [6, TS 38.214]
If "Bandwidth part indicator" field indicates a bandwidth part other than
the active bandwidth part and if both resource allocation type 0 and 1 are
configured for the indicated bandwidth part, the UE assumes resource
allocation type 0 for the indicated bandwidth part if the bitwidth of the
"Frequency domain resource assignment" field of the active bandwidth
part is smaller than the bitwidth of the "Frequency domain resource
assignment" field of the indicated bandwidth part.
Time domain resource assignment - 0, 1, 2, 3, or 4 bits as defined in
Subclause 6.1.2.1 of [6, TS38.214]. The bitwidth for this field is
determined as $\lceil \log_2(I) \rceil$ bits, where I is the number of entries in the higher
layer parameter pusch-TimeDomainAllocationList if the higher layer
parameter is configured; otherwise I is the number of entries in the
default table.
Frequency hopping flag - 0 or 1 bit:
0 bit if only resource allocation type 0 is configured or if the higher layer
parameter frequencyHopping is not configured;
1 bit according to Table 73.1.1.1-3 otherwise, only applicable to resource
allocation type 1, as defined in Subclause 6.3 of [6, TS 38.214].
Modulation and coding scheme - 5 bits as defined in Subclause 6.1.4.1 of
[6, TS 38.214]
New data indicator - 1 bit
Redundancy version - 2 bits as defined in Table 7.3. .1.1-2
HARQ process number - 4 bits
1st downlink assignment index - 1 or 2 bits:
1 bit for semi-static HARQ-ACK codebook;
2 bits for dynamic HARQ-ACK codebook.

TABLE 5-continued

2nd downlink assignment index - 0 or 2 bits:
2 bits for dynamic HARQ-ACK codebook with two HARQ-ACK
sub-codebooks; 0 bit otherwise.
TPC command for scheduled PUSCH - 2 bits as defined in Subclause
7.1.1 of [5, TS38.213 ]

SRS resource indicator -
$$\left\lceil \log_2\left( \sum_{k=1}^{min(L_{max},N_{SRS})} \binom{N_{SRS}}{k} \right) \right\rceil \text{ or } \lceil \log_2(N_{SRS}) \rceil$$

bits, where is the number of configured SRS resources in the SRS
resource
set associated with the higher layer parameter usage of value 'codeBook'
or 'nonCodeBook', $$\left\lceil \log_2\left( \sum_{k=1}^{min(L_{max},N_{SRS})} \binom{N_{SRS}}{k} \right) \right\rceil$$

bits according to Tables
7.3.1.1.2-28/29/30/31 if the higher layer parameter txConfig =
nonCodebook, where is the number of configured SRS resources in the
SRS resource set associated with the higher layer parameter usage of
value
'nonCodeBook' and if UE supports operation with maxMIMO-Layers and
the higher layer parameter maxMIMO-Layers of PUSCH-
ServingCellConfig of the serving cell is configured,
$L_{max}$ is given by that parameter otherwise,
$L_{max}$ is given by the maximum number of layers for PUSCH supported by
the UE for the serving cell for non-codebook based operation.
$\lceil \log_2(N_{SRS}) \rceil$
bits according to Tables 7.3.1.1.2-32 if the higher layer parameter
txConfig = codebook, where $N_{SRS}$ is the number of configured SRS
resources in the SRS resource set associated with the higher layer
parameter usage of value 'codeBook'.
Precoding information and number of layers - number of bits determined
by the following:
0 bits if the higher layer parameter txConfig = nonCodeBook;
0 bits for 1 antenna port and if the higher layer parameter
txConfig = codebook; 4, 5, or 6 bits according to Table 7.3.1.1.2-2
for 4 antenna ports, if txConfig = codebook, and according to whether
transform precoder is enabled or disabled, and the values of higher layer
parameters maxRank, and codebookSubset; 2, 4, or 5 bits according to
Table 7.3.1.1.2-3 for 4 antenna ports, if txConfig = codebook,
and according to whether transform precoder is enabled or disabled,
and the values of higher layer parameters maxRank, and codebookSubset;
2 or 4 bits according to Table7.3.1.1.2-4 for 2 antenna ports, if txConfig =
codebook, and according to whether transform precoder is enabled or
disabled, and the values of higher layer parameters maxRank and
codebookSubset; 1 or 3 bits according to Table7.3.1.1.2-5 for 2 antenna
ports, if txConfig = codebook, and according to whether transform
precoder is enabled or disabled, and the values of higher layer parameters
maxRank and codebookSubset.
Antenna ports - number of bits determined by the following
2 bits as defined by Tables 7.3.1.1.2-6, if transform precoder is enabled,
dmrs-Type = 1, and maxLength = 1;
4 bits as defined by Tables 7.3.1.1.2-7, if transform precoder is enabled,
dmrs-Type = 1, and maxLength = 2;
3 bits as defined by Tables 7.3.1.1.2-8/9/10/11, if transform precoder is
disabled, dmrs-Type = 1, and maxLength = 1, and the value of rank is
determined according to the SRS resource indicator field if the higher
layer
parameter txConfig = nonCodebook and according to the Precoding
information and number of layers field if the higher layer parameter
txConfig = codebook; 4 bits as defined by Tables 7.3.1.1.2-12/13/14/15,
if transform precoder isdisabled, dmrs-Type = 1, and maxLength 2, and
the value of rank is determined
according to the SRS resource indicator field if the higher layer parameter
txConfig = nonCodebook and according to the Precoding information and
number of layers field if the higher layer parameter txConfig = codebook;
4 bits as defined by Tables 7.3.1.1.2-16/17/18/19, if transform precoder is
disabled, dmrs-Type = 2, and maxLength = 1, and the value of rank is
determined according to the SRS resource indicator field if the higher
layer parameter txConfig = nonCodebook and according to the Precoding
information and number of layers field if the higher layer parameter
txConfig = codebook; 5 bits as defined by Tables 7.3.1.1.2-20/21/22/23,
if transform precoder is disabled, dmrs-Type = 2, and maxLength = 2, and
the value of rank is determined according to the SRS resource indicator
field if the higher layer parameter txConfig = nonCodebook and according

17

TABLE 5-continued to the Precoding information and number of layers field if the higher layer
parameter txConfig = codebook. where the number of CDM groups
data of values 1, 2, and 3 in Tables 7.3.1.1.2-6 to 7.3.1.1.2-23 refers to
CDM groups {0}, {0, 1}, and {0, 1, 2} respectively.
If a UE is configured with both dmrs-UplinkForPUSCH-MappingTypeA
and dmrs-UplinkForPUSCH-MappingTypeB, the bitwidth of this field
equals max{$x_A$, $x_B$} where $x_A$ is the "Antenna ports" bitwidth derived
according to dmrs-UplinkForPUSCH-MappingTypeA and $x_B$ is the
"Antenna ports" bitwidth derived according to dmrs-
UplinkForPUSCH-MappingTypeB. A number of $|x_A$-$x_B|$ zeros are
padded in the MSB of this field, if the mapping type of the PUSCH
corresponds to the smaller value of $x_A$ and $x_B$. SRS request - 2
bits as defined by Table 7.3.1.1.2-24 for UEs not configured
with supplementaryUplink in ServingCellConfig in the cell; 3 bits for UEs
configured with supplementaryUplink in ServingCellConfig in the cell
where the first bit is the non-SUL/SUL indicator as defined in
Table 7.3.1.1.1-1 and the second and third bits are defined by
Table 7.3.1.1.2-24. This bit field may also indicate the associated CSI-RS
according to Subclause 6.1.1.2 of [6, TS 38.214]. CSI
request - 0, 1, 2, 3, 4, 5, or 6 bits determined by higher layer parameter
reportTriggerSize.
CBG transmission information (CBGTI) - 0 bit if higher layer parameter
codeBlockGroupTransmission for PDSCH is not configured, otherwise,
2, 4, 6, or 8 bits determined by higher layer parameter
maxCodeBlockGroupsPerTransportBlock for PUSCH.

18

TABLE 5-continued

PTRS-DMRS association - number of bits determined as follows
0 bit if PTRS-UplinkConfig is not configured and transform precoder is
disabled, or if transform precoder is enabled, or if maxRank = 1;
2 bits otherwise, where Table 7.3.1.1.2-25 and 7.3.1.1.2-26 are used to
indicate the association between PTRS port(s) and DMRS port(s) for
transmission of one PT-RS port and two PT-RS ports respectively, and
the DMRS ports are indicated by the Antenna ports field.
If "Bandwidth part indicator" field indicates a bandwidth part other than
the active bandwidth part and the "PTRS-DMRS association" field is
present for the indicated bandwidth part but not present for the active
bandwidth part, the UE assumes the "PTRS-DMRS association" field is
not present for the indicated bandwidth part. beta_offset indicator - 0
if the higher layer parameter betaOffsets = semi Static; otherwise
2 bits as defined by Table 9.3-3 in [5, TS 38.213],
DMRS sequence initialization - 0 bit if transform precoder is enabled, 1
bit if transform precoder is disabled.
UL-SCH indicator - 1 bit, A value of "1" indicates UL-SCH shall be
transmitted on the PUSCH and a value of "0" indicates UL-SCH shall not
be transmitted on the PUSCH. Except for DCI format 0_1 with CRC
scrambled by SP-CSI-RNTI, a UE is not expected to receive a DCI
format 0_1 with UL-SCH indicator of "0" and CSI request of all zero(s).

DCI format 1_0 may be used as fallback DCI scheduling
a PDSCH, and in this case, a CRC may be scrambled by a
C-RNTI. DCI format 1_0 having a CRC scrambled by a
C-RNTI may include, for example, pieces of information as
shown in Table 6 below.

TABLE 6

-Identifier for DCI formats - 1 bits
-The value of this bit field is always set to 1, indicating a DL DCI format
Frequency domain resource assignment -

$$\left\lceil \log_2\left(N_{RB}^{DL,BWP}\left(N_{RB}^{DL,BWP} + 1\right)/2\right)\right\rceil \quad \text{bits where}$$

$N_{RB}^{DL,BWP}$ is given by subclause 7.3.1.0

If the CRC of the DCI format 1_0 is scrambled by C-RNTI and the "Frequency
domain resource assignment" field are of all ones, the DCI format 1_0 is for random access
procedure initiated by a PDCCH order, with all remaining fields set as
follows:
Random Access Preamble index - 6 bits according to ra-PreambleIndex in
Subclause 5.1.2 of [8, TS38.321]
UL/SUL indicator - 1 bit. If the value of the "Random Access Preamble index" is
not all zeros and if the UE is configured with supplementaryUplink in
ServingCellConfig in the cell, this field indicates which UL carrier in the cell to
transmit the PRACH according to Table 7.3.1.1.1 -1; otherwise, this field is reserved
SS/PBCH index - 6 bits. If the value of the "Random Access Preamble index" is not
all zeros, this field indicates the SS/PBCH that shall be used to determine the RACH
occasion for the PRACH transmission; otherwise, this field is reserved.
PRACH Mask index - 4 bits. If the value of the "Random Access Preamble index"
is not all zeros, this field indicates the RACH occasion associated with the SS/PBCH
indicated by "SS/PBCH index" for the PRACH transmission, according to Subclause
5.1.1 of [8, TS38.321]; otherwise, this field is reserved
Reserved bits - 10 bits
Otherwise, all remaining fields are set as follows:
Time domain resource assignment - 4 bits as defined in Subclause 5.1.2.1 of [6, TS 38.214]
VRB-to-PRB mapping - 1 bit according to Table 7.3.1.2.2-5
Modulation and coding scheme - 5 bits as defined in Subclause 5.1.3 of [6, TS 38.214]
New data indicator - 1 bit
Redundancy version - 2 bits as defined in Table 7.3.1.1.1-2
HARQ process number - 4 bits
Downlink assignment index - 2 bits as defined in Subclause 9.1.3 of [5, TS 38.213],
as counter DAI
TPC command for scheduled PUCCH (- 2 bits as defined in Subclause 7.2.1 of [5,
TS 38.213]
PUCCH resource indicator - 3 bits as defined in Subclause 9.2.3 of [5, TS 38.213]
-        PDSCH-to-HARQ_feedback timing indicator - 3 bits as defined in
Subclause 9.2.3 of [5, TS38.213]

DCI format 1_1 may be used as non-fallback DCI scheduling a PDSCH, and in this case, a CRC may be scrambled by a C-RNTI. DCI format 1_1 having a CRC scrambled by a C-RNTI may include, for example, pieces of information as shown in Table 7 below.

TABLE 7

Identifier for DCI formats - 1 bits
The value of this bit field is always set to 1, indicating a DL DCI format
Carrier indicator - 0 or 3 bits as defined in Subclause 10.1 of [5, TS 38.213].
Bandwidth part indicator - 0, 1 or 2 bits as determined by the number of DL BWPs
$n_{BWP,RRC}$ configured by higher layers, excluding the initial DL bandwidth part. The
bitwidth for this field is determined as . $\lceil \log_2(n_{BWP}) \rceil$ bits, where
$n_{BWP} = n_{BWP,RRC} + 1$ if $n_{BWP,RRC} \leq 3$, in which case the bandwidth part indicator
is equivalent to the ascending order of the higher layer parameter BWP-Id;
otherwise $n_{BWP} = n_{BWP,RRC}$, in which case the bandwidth part indicator is defined
in Table 7.3.1.1.2-1;
If a UE does not support active BWP change via DCI, the UE ignores this bit field.
Frequency domain resource assignment - number of bits determined by the following, where $N_{RB}^{DL,BWP}$     is the size of the active DL bandwidth part:

$N_{RBG}$ bits if only resource allocation type 0 is configured, where . $N_{RBG}$ is defined in Subclause 5.1.2.2.1 of [6, TS38.214],    $\lceil \log_2(N_{RB}^{DL,BWP}(N_{RB}^{DL,BWP} + 1)/2) \rceil$ bits if only resource allocation type 1 is configured, or max $\lceil \log_2(N_{RB}^{DL,BWP}(N_{RB}^{DL,BWP} + 1)/2) \rceil, N_{RBG}) + 1$     bits if both resource allocation type 0 and 1 are configured.
If both resource allocation type 0 and 1 are configured, the MSB bit is used to
indicate resource allocation type 0 or resource allocation type 1, where the bit value
of 0 indicates resource allocation type 0 and the bit value of 1 indicates resource
allocation type 1.
For resource allocation type 0, the $N_{RBG}$ LSBs provide the resource allocation as
defined in Subclause 5.1.2.2.1 of [6, TS 38.214].

For resource allocation type 1, the    $\lceil \log_2(N_{RB}^{DL,BWP}(N_{RB}^{DL,BWP} + 1)/2) \rceil$ LSBs provide the resource allocation as defined in Subclause 5.1.2.2.2 of [6, TS 38.214]
If "Bandwidth part indicator" field indicates a bandwidth part other than the active
bandwidth part and if both resource allocation type 0 and 1 are configured for the
indicated bandwidth part, the UE assumes resource allocation type 0 for the
indicated bandwidth part. if the bitwidth of the "Frequency domain resource
assignment" field of the active bandwidth part is smaller than the bitwidth of the
"Frequency domain resource assignment" field of the indicated bandwidth part.
Time domain resource assignment - 0, 1, 2, 3, or 4 bits as defined in Subclause
5.1.2.1 of [6, TS 38.214]. The bitwidth for this field is determined as $\lceil \log_2(I) \rceil$ bits,
where I is the number of entries in the higher layer parameter pdsch-
TimeDomainAllocationList if the higher layer parameter is configured; otherwise I
is the number of entries in the default table.
VRB-to-PRB mapping - 0 or 1 bit:
0 bit if only resource allocation type 0 is configured or if interleaved VRB-to-PRB
mapping is not configured by high layers;
1 bit according to Table 7.3.1.2.2-5 otherwise, only applicable to resource
allocation type 1, as defined in Subclause 7.3.1.6 of [4, TS 38.211].
PRB bundling size indicator - 0 bit if the higher layer parameter prb-BundlingType
is not configured or is set to 'static', or 1 bit if the higher layer parameter prb-
BundlingType is set to 'dynamic' according to Subclause 5.1.2.3 of [6, TS 38.214].
Rate matching indicator - 0, 1, or 2 bits according to higher layer parameters
rateMatchPatternGroup1 and rateMatchPatternGroup2, where the MSB is used to
indicate rateMatchPatternGroup1 and the LSB is used to indicate
rateMatchPatternGroup2 when there are two groups.
ZP CSI-RS trigger - 0, 1, or 2 bits as defined in Subclause 5.1.4.2 of [6, TS 38.214].
The bitwidth for this field is determined as $\lceil \log_2(n_{ZP} + 1) \rceil$ bits, where $n_{ZP}$ is the
number of aperiodic ZP CSI-RS resource sets configured by higher layer.
For transport block 1:
Modulation and coding scheme - 5 bits as defined in Subclause 5.1.3.1 of [6, TS 38.214]
New data indicator - 1 bit
Redundancy version - 2 bits as defined in Table 7.3.1.1.1-2
For transport block 2 (only present if maxNrofCodeWordsScheduledByDCI equals 2):
Modulation and coding scheme - 5 bits as defined in Subclause 5.1.3.1 of [6, TS 38.214]
New data indicator - 1 bit
Redundancy version - 2 bits as defined in Table 7.3.1.1.1-2

TABLE 7-continued

If "Bandwidth part indicator" field indicates a bandwidth part other than the active
bandwidth part and the value of maxNrofCodeWordsScheduledByDCI for the
indicated bandwidth part equals 2 and the value of
maxNrofCodeWordsScheduledByDCI for the active bandwidth part equals 1, the
UE assumes zeros are padded when interpreting the "Modulation and coding
scheme", "New data indicator", and "Redundancy version" fields of transport block
2 according to Subclause 12 of [5, TS38.213], and the UE ignores the "Modulation
and coding scheme", "New data indicator", and "Redundancy version" fields of
transport block 2 for the indicated bandwidth part.
HARQ process number - 4 bits
Downlink assignment index - number of bits as defined in the following
4 bits if more than one serving cell are configured in the DL and the higher layer
parameter pdsch-HARQ-ACK-Codebook=dynamic, where the 2 MSB bits are the
counter DAI and the 2 LSB bits are the total DAI;
2 bits if only one serving cell is configured in the DL and the higher layer parameter
pdsch-HARQ-ACK-Codebook=dynamic, where the 2 bits are the counter DAI;
0 bits otherwise.
TPC command for scheduled PUCCH - 2 bits as defined in Subclause 7.2.1 of [5,
TS 38.213]
PUCCH resource indicator - 3 bits as defined in Subclause 9.2.3 of [5, TS 38.213]
PDSCH-to-HARQ_feedback timing indicator - 0, 1, 2, or 3 bits as defined in
Subclause 9,2.3 of [5, TS 38.213]. The bitwidth for this field is determined as
$\lceil \log_2(I) \rceil$ bits, where I is the number of entries in the higher layer parameter dl-
DataToUL-ACK.
Antenna port(s) - 4, 5, or 6 bits as defined by Tables 7.3.1.2.2-1/2/3/4, where the
number of CDM groups without data of values 1, 2, and 3 refers to CDM groups
{0}, {0,1}, and {0, 1,2} respectively. The antenna ports $\{p_{0,...}p_{0-1}\}$ shall be
determined according to the ordering of DMRS port(s) given by Tables 7.3.1.2.2-1/2/3/4.
If a UE is configured with both dmrs-DownlinkForPDSCH-MappingTypeA and
dmrs-DownlinkForPDSCH-MappingTypeB, the bitwidth of this field equals
$\max\{x_A,x_B\}$, where $x_A$ is the "Antenna ports" bitwidth derived according to
dmrs-DownlinkForPDSCH-MappingTypeA and $x_B$ is the "Antenna ports"
bitwidth derived according to dmrs-DownlinkForPLJSCH-MappingTypeB. A
number of $|x_A-x_B|$ zeros are padded in the MSB of this field, if the mapping type
of the PDSCH corresponds to the smaller value of $x_A$ and $x_B$ .
Transmission configuration indication - 0 bit if higher layer parameter tci-
PresentInDCI is not enabled; otherwise 3 bits as defined in Subclause 5.1.5 of [6,
TS38.214]
If "Bandwidth part indicator" field indicates a bandwidth part other than the active
bandwidth part;
if the higher layer parameter tci-PresentInDCI is not enabled for the CORESET
used for the PDCCH carrying the DCS format 1_1,
the UE assumes tci-PresentInDCI is not enabled for all CORESETs in the indicated
bandwidth part,
otherwise,
the UE assumes tci-PresentInDCI is enabled for all CORESETs in the indicated
bandwidth part.
SRS request - 2 bits as defined by Table 7.3.1.1.2-24 for UEs not configured with
supplementaryUplink in ServingCellConfig in the cell; 3 bits for UEs configured
with supplementaryUplink in ServingCellConfig in the cell where the first bit is the
non-SUL/SUL indicator as defined in Table 7.3.1.1.1-1 and the second and third
bits are defined by Table 7.3.1.1.2-24. This bit field may also indicate the associated
CSI-RS according to Subclause 6.1.1.2 of [6, TS 38.214].
CBG transmission information (CBGTI) - 0 bit if higher layer parameter
codeBlockGroupTransmission for PDSCH is not configured, otherwise, 2, 4, 6, or
8 bits as defined in Subclause 5.1.7 of [6, TS38.214], determined by the higher layer
parameters          maxCodeBlockGroupsPerTransportBlock          and
maxNrofCodeWordsScheduledByDCI for the PDSCH.
CBG flushing out information (CBGFI) (- 1 bit if higher layer parameter
codeBlockGroupFlushIndicator is configured as "TRUE", 0 bit otherwise.
-        DMRS sequence initialization - 1 bit.

Hereinafter, a method for allocating time domain resources for a data channel in a 5G wireless communication system will be described.

A base station may configure, for a terminal, a table relating to time domain resource allocation information for a downlink data channel (physical downlink shared channel, PDSCH) and an uplink data channel (physical uplink shared channel, PUSCH) through higher layer signaling (e.g., RRC signaling). A table configured by a maximum of 16 (maxNrofDL-Allocations) entries may be configured for a PDSCH, and a table configured by a maximum of 16 (maxNrofUL-Allocations) entries may be configured for a PUSCH. Time domain resource allocation information may include, for example, a PDCCH-to-PDSCH slot timing (this corresponds to a time interval expressed in the units of slots, between a time point of reception of a PDCCH and a time point of transmission of a PDSCH scheduled by the received PDCCH, the timing being indicated by K0) or a PDCCH-to-PUSCH slot timing (this corresponds to a time interval expressed in the units of slots, between a time point of reception of a PDCCH and a time point of transmission of a PUSCH scheduled by the received PDCCH, the timing being indicated by K2), information on the length by which and the starting symbol position at which a PDSCH or a PUSCH is scheduled in a slot, a mapping type of a PDSCH or a PUSCH, and the like. For example, a terminal may be notified of pieces of information as shown in Tables 8 and 9 below by a base station.

TABLE 8

```
PDSCH-TimeDomainResourceAllocationList        ::=        SEQUENCE
(SIZE(1. .maxNrofDL-Allocations))             OF          PDSCH-
TimeDomainResourceAllocation
PDSCH-TimeDomainResourceAllocation ::=  SEQUENCE {
k0                                          INTEGER(0. .32)
OPTIONAL,    -- NeedS
(PDCCH-to-PDSCH timing in units of slots)
mappingType                             ENUMERATED {typeA,
typeB},
(PDSCH mapping type)
startSymbolAndLength                    INTEGER (0. .127)
(Length and starting symbol of PDSCH)
}
```

TABLE 9

```
PUSCH-TimeDomainResourceAllocationList := SEQUENCE
(SIZE(1. .maxNrofUL-Allocations))            OF
PUSCH-
TimeDomainResourceAllocation
PUSCH-TimeDomainResourceAllocation ::=  SEQUENCE {
k2                                          INTEGER (0. .32)
OPTIONAL,   -- Need S
(PDCCH-to-PUSCH timing in units of slots)
mappingType                             ENUMERATED {typeA,
typeB},
(PUSCH mapping type)
startSymbolAndLength                    INTEGER (0. . .127)
(Length and starting symbol of PUSCH)
}
```

A base station may notify the terminal of one of the entries of a table relating to time domain resource allocation information through L1 signaling (e.g., DCI). For example, the base station may indicate same by using a "time domain resource allocation" field in DCI. The terminal may obtain time domain resource allocation information for a PDSCH or PUSCH, based on the DCI received from the base station. Hereinafter, a method for allocating frequency domain resources for a data channel in a 5G wireless communication system will be described. A 5G wireless communication system supports two types including resource allocation type 0 and resource allocation type 1, as a method for indicating frequency domain resource allocation information for a downlink data channel (physical downlink shared channel (PDSCH)) and an uplink data channel (physical uplink shared channel (PUSCH)).

Resource Allocation Type 0

RB allocation information may be notified from a base station to a terminal in a type of a bitmap for resource block groups (RBGs). An RBG may be configured by a set of consecutive virtual RBs (VRBs), and the size P of an RBG (nominal RBG size P) may be determined based on a value configured by a higher layer parameter (rbg-Size), and a value of the size of a bandwidth part defined in Table 10 below.

TABLE 10

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

A total number ($N_{RBG}$) of RBGs of bandwidth part i having a size of $$N_{BWP,i}^{size}$$

may be defined as below.

$$N_{RBG} = \left\lceil \left( N_{BWP,i}^{size} + \left( N_{BWP,i}^{start} \bmod P \right) \right) / P \right\rceil, \text{ where}$$

the size of the first RBG is $$RBG_0^{size} = P - N_{BWP,i}^{start} \bmod P,$$

the size of last RBG is $$RBG_{last}^{size} = \left( N_{BWP_i}^{start} + N_{BWP_i}^{size} \right) \bmod P$$

if $$\left( N_{BWP,i}^{start} + N_{BWP,i}^{size} \right) \bmod P > 0$$

and P otherwise.

the size of all other RBGs is P.

Each bit of a bitmap having a size of $N_{RBG}$ bits may correspond to each RBG. RBGs may be assigned indexes according to a sequence in which the frequency increases from the lowest frequency position of a bandwidth part. With respect to $N_{RBG}$ number of RBGs in a bandwidth part, RBG #0 to RBG #($N_{RBG}-1$) may be mapped from the MSB to the LSB of an RBG bitmap. In case that a particular bit value in a bitmap is 1, a terminal may determine that an RBG corresponding to the bit value has been assigned, and in case that a particular bit value in a bitmap is 0, the terminal may determine that an RBG corresponding to the bit value has not been assigned.

Resource Allocation Type 1

RB allocation information may be notified from a base station to a terminal by information on the starting position and length of consecutively assigned VRBs. Interleaving or non-interleaving may be additionally applied to the consecutively assigned VRBs. A resource allocation field of resource allocation type 1 may be configured by a resource indication value (RIV), and the RIV may be configured by the starting point ($RB_{start}$) of VRBs and the length ($L_{RBs}$) of consecutively assigned RBs. More specifically, an RIV of a bandwidth part having a size of $$N_{BWP}^{size}$$

may be defined as follows.
  if $$(L_{RBs} - 1) \le \left\lfloor N_{BWP}^{size}/2 \right\rfloor$$

then $$RIV = N_{BWP}^{size}(L_{RBs} - 1) + RB_{start}$$

else $$RIV = N_{BWP}^{size}\left(N_{BWP}^{size} - L_{RBs} + 1\right) + \left(N_{BWP}^{size} - 1 - RB_{start}\right)$$

where $L_{RBs} \geq 1$ and shall not exceed $$N_{BWP}^{size} - RB_{start}.$$

A base station may configure, for a terminal, a resource allocation type through higher layer signaling (e.g., a higher layer parameter resourceAllocation may be configured to have one value among resourceAllocationType0, resourceAllocationType1, or dynamicSwitch). If both resource allocation types 0 and 1 are both configured for a terminal (or in the same way, the higher layer parameter resourceAllocation is configured to be dynamicSwitch), a bit corresponding to the most significant bit (MSB) in a resource allocation indication field in a DCI format indicating scheduling may indicate resource allocation type 0 or 1. In addition, resource allocation information may be indicated through the bits remaining after excluding the bit corresponding to the MSB, based on the indicated resource allocation type, and the terminal may interpret resource allocation field information of a DCI field, based on the resource allocation information. If one of resource allocation type 0 or 1 is configured for the terminal (or in the same way, the higher layer parameter resourceAllocation is configured to have one value among resourceAllocationType0 or resourceAllocationType1), a resource allocation indication field in a DCI format indicating scheduling may indicate resource allocation information, based on the configured resource allocation type, and the terminal may interpret resource allocation field information of a DCI field, based on the resource allocation information.

Hereinafter, a modulation and coding scheme (MCS) used in a 5G wireless communication system will be described.

In 5G, multiple MCS index tables are defined for scheduling of a PDSCH and a PUSCH. Which MCS table a terminal is to assume among the multiple MCS tables may be configured for or indicated to the terminal by a base station through higher layer signaling, L1 signaling, or an RNTI value assumed by the terminal upon PDCCH decoding.

MCS index table 1 for a PDSCH and a CP-OFDM-based PUSCH (or PUSCH without transform precoding) may be the same as Table 11 below.

TABLE 11

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |

TABLE 11-continued

| MCS Index $I_{MCS}$ | Modulation Order $Q_m$ | Target code Rate R × [1024] | Spectral efficiency |
|---|---|---|---|
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2,5664 |
| 18 | 6 | 466 | 2,7305 |
| 19 | 6 | 517 | 3,0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

MCS index table 2 for a PDSCH and a CP-OFDM-based PUSCH (or PUSCH without transform precoding) may be the same as Table 12 below.

TABLE 12

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

MCS index table 3 for a PDSCH and a CP-OFDM-based PUSCH (or PUSCH without transform precoding) may be the same as Table 13 below.

TABLE 13

| MCS Index $I_{MCS}$ | Modulation Order $Q_m$ | Target code Rate R × [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | reserved | |
| 30 | 4 | reserved | |
| 31 | 6 | reserved | |

MCS index table 1 for a DFT-s-OFDM-based PUSCH (or PUSCH with transform precoding) may be the same as Table 14 below.

TABLE 14

| MCS Index $I_{MCS}$ | Modulation Order $Q_m$ | Target code Rate R × 1024 | Spectral efficiency |
|---|---|---|---|
| 0 | q | 240/q | 0.2344 |
| 1 | q | 314/q | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 466 | 2.7305 |
| 18 | 6 | 517 | 3.0293 |
| 19 | 6 | 567 | 3.3223 |
| 20 | 6 | 616 | 3.6094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |

TABLE 14-continued

| MCS Index $I_{MCS}$ | Modulation Order $Q_m$ | Target code Rate R × 1024 | Spectral efficiency |
|---|---|---|---|
| 28 | q | reserved | |
| 29 | 2 | reserved | |
| 30 | 4 | reserved | |
| 31 | 6 | reserved | |

MCS index table 2 for a DFT-s-OFDM-based PUSCH (or PUSCH with transform precoding) may be the same as Table 15 below.

TABLE 15

| MCS Index $I_{MCS}$ | Modulation Order $Q_m$ | Target code Rate R × 1024 | Spectral efficiency |
|---|---|---|---|
| 0 | q | 60/q | 0.0586 |
| 1 | q | 80/q | 0.0781 |
| 2 | q | 100/q | 0.0977 |
| 3 | q | 128/q | 0.1250 |
| 4 | q | 156/q | 0.1523 |
| 5 | q | 198/q | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 2 | 679 | 1.3262 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 4 | 658 | 2.5703 |
| 22 | 4 | 699 | 2.7305 |
| 23 | 4 | 772 | 3.0156 |
| 24 | 6 | 567 | 3.3223 |
| 25 | 6 | 616 | 3.6094 |
| 26 | 6 | 666 | 3.9023 |
| 27 | 6 | 772 | 4.5234 |
| 28 | q | reserved | |
| 29 | 2 | reserved | |
| 30 | 4 | reserved | |
| 31 | 6 | reserved | |

An MCS index table for a PUSCH to which transform precoding (or discrete Fourier transform (DFT)) and 64 QAM have been applied may be the same as Table 16 below.

TABLE 16

| MCS Index $I_{MCS}$ | Modulation Order $Q_m$ | Target code Rate R × 1024 | Spectral efficiency |
|---|---|---|---|
| 0 | q | 240/q | 0.2344 |
| 1 | q | 314/q | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |

TABLE 16-continued

| MCS Index $I_{MCS}$ | Modulation Order $Q_m$ | Target code Rate R × 1024 | Spectral efficiency |
|---|---|---|---|
| 14 | 4 | 553 | 2.1602 |
| 15 | 4 | 616 | 2.4063 |
| 16 | 4 | 658 | 2.5703 |
| 17 | 6 | 466 | 2.7305 |
| 18 | 6 | 517 | 3.0293 |
| 19 | 6 | 567 | 3.3223 |
| 20 | 6 | 616 | 3.6094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |
| 28 | q | | reserved |
| 29 | 2 | | reserved |
| 30 | 4 | | reserved |
| 31 | 6 | | reserved |

An MCS index table for a PUSCH to which transform precoding (or discrete Fourier transform (DFT)) and 64 QAM have been applied may be the same as Table 17 below.

TABLE 17

| MCS Index $I_{MCS}$ | Modulation Order $Q_m$ | Target code Rate R × 1024 | Spectral efficiency |
|---|---|---|---|
| 0 | q | 60/q | 0.0586 |
| 1 | q | 80/q | 0.0781 |
| 2 | q | 100/q | 0.0977 |
| 3 | q | 128/q | 0.1250 |
| 4 | q | 156/q | 0.1523 |
| 5 | q | 198/q | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 2 | 679 | 1.3262 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 4 | 658 | 2.5703 |
| 22 | 4 | 699 | 2.7305 |
| 23 | 4 | 772 | 3.0156 |
| 24 | 6 | 567 | 3.3223 |
| 25 | 6 | 616 | 3.6094 |
| 26 | 6 | 666 | 3.9023 |
| 27 | 6 | 772 | 4.5234 |
| 28 | q | | reserved |
| 29 | 2 | | reserved |
| 30 | 4 | | reserved |
| 31 | 6 | | reserved |

Hereinafter, a downlink control channel of a 5G wireless communication system will be described in detail with reference to the drawings.

Figure 4:
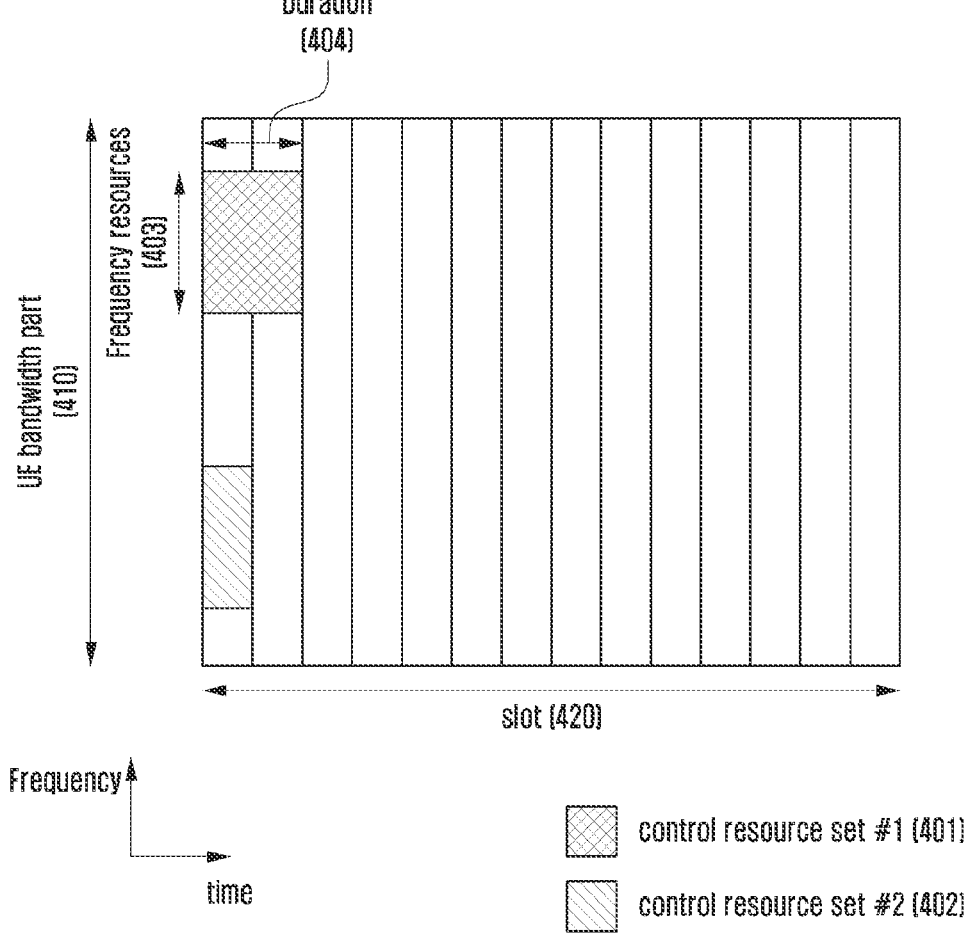
FIG. 4 illustrates an example of a control resource set in which a downlink control channel is transmitted in a 5G wireless communication system according to an embodiment of the disclosure.

FIG. 4 illustrates an example of a control resource set in which a downlink control channel is transmitted in a 5G wireless communication system according to an embodiment of the disclosure.

Referring to FIG. 4, a terminal bandwidth part (UE bandwidth part) 410 along a frequency axis, and two control resource sets (control resource set #1 401 and control resource set #2 402) in one slot 420 along a time axis may be configured. The control resource sets 401 and 402 may be configured on a particular frequency resource 403 in the entire terminal bandwidth part 410 along the frequency axis. In addition, the control resource sets 401 and 402 may be configured to have one or multiple OFDM symbols along the time axis and the symbols may be defined as a control resource set duration 404. With reference to the example illustrated in FIG. 4, control resource set #1 401 is configured to have a control resource set duration of two symbols, and control resource set #2 402 is configured to have a control resource set duration of one symbol.

A control resource set in a 5G wireless communication system described above may be configured for a terminal by a base station through higher layer signaling (e.g., system information, master information block (MIB), and radio resource control (RRC) signaling). Configuring of a control resource set for a terminal means providing of information such as a control resource set identifier (identity), the frequency position of the control resource set, the symbol length of the control resource set, etc. For example, the information may include pieces of information as in Table 18 below.

TABLE 18

```
ControlResourceSet ::=              SEQUENCE {
Corresponds to L1 parameter 'CORESET-ID'
controlResourceSetId              ControlResourceSetId,
(Control resource set identifier (identity))
frequency DomainResources         BIT STRING (SIZE (45)),
(Frequency axis resource allocation information)
duration                          INTEGER (1. .maxCoReSetDuration),
(Time axis resource allocation information)
cce-REG-MappingType               CHOICE {
(CCE-to-REG mapping scheme)
interleaved                       SEQUENCE {
reg-BundleSize                    ENUMERATED {n2, n3, n6},
(REG bundle size)
precoderGranularity               ENUMERATED    {same AsREG-
bundle, allContiguousRBs},
interleaverSize                   ENUMERATED {n2, n3, n6}
(Interleaver size)
shiftindex
INTEGER(0. .maxNrofPhysicalResourceBlocks-1)
                        OPTIONAL
(Interleaver shift)
},
nonInterleaved                    NULL
},
tci-StatesPDCCH                   SEQUENCE(SIZE (1. .maxNrofTCI-
StatesPDCCH)) OF TCI-StateId     OPTIONAL,
(QCL configuration information)
tci-PresentInDCI                  ENUMERATED {enabled}
                                  OPTIONAL,   -- Need S
}
```

Figure 5:
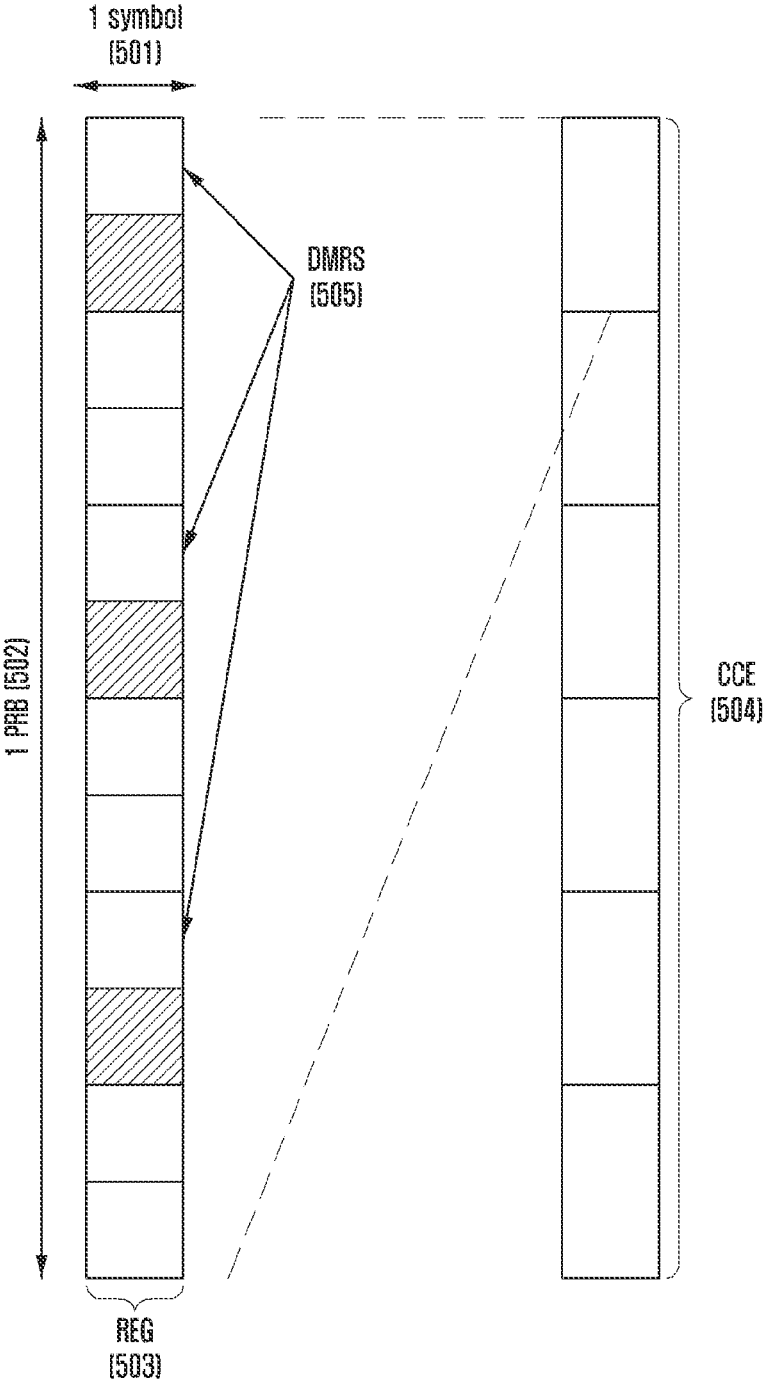
FIG. 5 illustrates a structure of a downlink control channel of a 5G wireless communication system according to an embodiment of the disclosure.

In Table 18 above, tci-StatesPDCCH (hereinafter, referred to as a transmission configuration indication (TCI) state) configuration information may include index information of one or multiple synchronization signal/physical broadcast channel (SS/PBCH) blocks quasi-co-located (QCLed) with a DMRS transmitted on a corresponding control resource set, or index information of a channel state information reference signal (CSI-RS). FIG. 5 illustrates a structure of a downlink control channel of a 5G wireless communication system according to an embodiment of the disclosure. That is, FIG. 5 shows an example of a basic unit of time and frequency resources configuring a downlink control channel available in a 5G wireless communication system.

Referring to FIG. 5, a basic unit of time and frequency resources configuring a control channel may be named a resource element group (REG) 503, and the REG 503 may be defined by one OFDM symbol 501 in a time axis and one physical resource block (PRB) 502, that is, 12 subcarriers in a frequency axis. A base station connects and attaches REGs 503 to each other to configure a downlink control channel assignment unit.

As illustrated in FIG. 5, in case that a basic unit for the assignment of a downlink control channel in a 5G wireless communication system is a control channel element (CCE) 504, one CCE 504 may be configured by multiple REGs 503. For example, the REG 503 illustrated in FIG. 5 may be configured by 12 REs, and if one CCE 504 is configured by six REGs 503, the one CCE 504 may be configured by 72 REs. If a downlink control resource set is configured, the corresponding region may be configured by a plurality of CCEs 504, and a particular downlink control channel may be transmitted after being mapped to one or multiple CCEs 504 according to an aggregation level (AL) in the control resource set. CCEs 504 in a control resource set are distinguished by numbers, and the numbers of the CCEs 504 may be assigned according to a logical mapping scheme.

The basic unit of a downlink control channel, illustrated in FIG. 5, that is, the REG 503, may include both REs to which DCI is mapped and a region to which a DMRS 505, which is a reference signal for decoding the DCI, is mapped. As illustrated in FIG. 5, three DMRSs 505 may be transmitted in one REG 503. The number of CCEs required for transmitting a PDCCH may be 1, 2, 4, 8, and 16 according to aggregation levels (ALs), and different numbers of CCEs may be used to implement the link adaptation of a downlink control channel. For example, in case that AL=L, one downlink control channel may be transmitted through L number of CCEs. A terminal is required to detect a signal in the state where the terminal does not know information about a downlink control channel, and a search space indicating a set of CCEs is defined for blind decoding. A search space is a set of downlink control channel candidates configured by CCEs to which a terminal is required to attempt to decode at a given aggregation level. Since there are various aggregation levels grouping 1, 2, 4, 8, and 16 CCEs into one, a terminal may have a plurality of search spaces. A search space set may be defined as a set of search spaces at all configured aggregation levels.

Search spaces may be classified into a common search space and a terminal (UE)-specific search space. A particular group of terminals or all terminals may investigate a common search space for a PDCCH to receive cell-common control information such as a paging message or dynamic scheduling for system information. For example, PDSCH scheduling assignment information for transmission of an SIB including service operator information of a cell may be received by investigating a common search space for a PDCCH. In the case of a common search space, a particular group of terminals or all terminals are required to receive a PDCCH, and thus the common search space may be defined as a pre-promised set of CCEs. Scheduling assignment information for a terminal-specific PDSCH or PUSCH may be received by investigating a terminal-specific search space for a PDCCH. A terminal-specific search space may be defined terminal-specifically by using the identity of a terminal and a function of various system parameters.

In a 5G wireless communication system, a parameter related to a search space for a PDCCH may be configured for a terminal by a base station through higher layer signaling (e.g., SIB, MIB, or RRC signaling). For example, a base station may configure, for a terminal, the number of PDCCH candidates at each aggregation level L, a monitoring period for a search space, a monitoring occasion expressed in the units of symbols in a slot of a search space, a search space type (common search space or terminal-specific search space), a combination of an RNTI and a DCI format to be monitored in a corresponding search space, and the index of a control resource set in which a search space is to be monitored. For example, a parameter related to a search space for a PDCCH may include pieces of information as in Table 19 below.

TABLE 19

| Search Space ::= | SEQUENCE { |
|---|---|
| Identity of the search space. SearchSpaceId = 0 identifies the SearchSpace configured via PBCH (MIB) or ServingCellConfigCommon | |
| searchSpaceId | SearchSpaceId, |
| (Search space identifier) | |
| controlResourceSetId | ControlResourceSetId, |
| (Control resource set identifier) | |
| monitoringSlotPeriodicityAndOffset | CHOICE { |
| (Monitoring slot level period) | |
| sl1 | NULL, |
| sl2 | INTEGER (0. .1), |
| sl4 | INTEGER (0. .3), |
| sl5 | INTEGER (0. .4), |
| sl8 | INTEGER (0. .7), |
| sl10 | INTEGER (0. .19), |
| sl16 | INTEGER (0. .15), |
| sl20 | INTEGER (0. .19) |
| } | |
| | OPTIONAL, |
| duration(Monitoring length) | INTEGER (2. .2559) |
| monitoringSymbolsWithinSlot | BIT STRING (SIZE (14)) |
| | OPTIONAL, |
| (Monitoring symbols in slot) | |
| nrofCandidates | SEQUENCE { |
| (The number of PDCCH candidates for each aggregation level) | |
| aggregationLevel 1 | ENUMERATED {n0, n1, n2, n3, n4, n5, n6, n8}, |
| aggregati onLevel2 | ENUMERATED {n0, n1, n2, n3, n4, n5, n6, n8}, |
| aggregationLevel4 | ENUMERATED {n0, n1, n2, n3, n4, n5, n6, n8}, |
| aggregationLevel 8 | ENUMERATED {n0, n1, n2, n3, n4, n5, n6, n8}, |
| aggregationLevel 16 | ENUMERATED {n0, n1, n2, n3, n4, n5, n6, n8} |
| }, | |
| search SpaceType | CHOICE { |
| (Search space type) | |
| Configures this search space as common search space (CSS) and DCI formats to monitor. | |
| common | SEQUENCE { |
| (Common search space) | |
| } | |
| ue-Specific | SEQUENCE { |
| (Terminal-specific search space) | |
| Indicates whether the UE monitors in this USS for DCI formats 0-0 and 1-0 or for formats 0-1 and 1-1. | |
| formats | ENUMERATED {formats0-0-And-1-0, formats0-1-And-1- 1}, |
| . . . | |
| } | |

A base station may configure one or multiple search space sets for a terminal according to configuration information. According to an embodiment, a base station may configure, for a terminal, search space set #1 and search space set #2. In search space set 1, DCI format A scrambled by an X-RNTI may be configured to be monitored in a common search space, and in search space set 2, DCI format B scrambled by an Y-RNTI may be configured to be monitored in a terminal-specific search space. According to configuration information, one or multiple search space sets may exist in a common search space or a terminal-specific search space. For example, search space set #1 and search space set #2 may be configured to be common search spaces, and search space set #3 and search space set #4 may be config-
ured to be terminal-specific search spaces. In a common
search space, the following combinations of a DCI format
and an RNTI may be monitored. However, the disclosure is
not limited to the example below.

DCI format 0_0/1_0 with CRC scrambled by C-RNTI,
CS-RNTI, MCS-C-RNTI, SP-CSI-RNTI, RA-RNTI,
TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-
RNTI, TPC-PUCCH-RNTI DCI format 2_3 with CRC scrambled by TPC-SRS-RNTI In a terminal-specific search space, the following combi-
nations of a DCI format and an RNTI may be monitored.
However, the disclosure is not limited to the example below.

DCI format 0_0/1_0 with CRC scrambled by C-RNTI,
CS-RNTI, TC-RNTI

DCI format 1_0/1_1 with CRC scrambled by C-RNTI,
CS-RNTI, TC-RNTI

The mentioned RNTIs may follow the definitions and
purposes below.

Cell RNTI (C-RNTI): for the purpose of scheduling a
terminal-specific PDSCH

Modulation coding scheme C-RNTI (MCS-C-RNTI): for
the purpose of scheduling a terminal-specific PDSCH Temporary Cell RNTI (TC-RNTI): for the purpose of
scheduling a terminal-specific PDSCH Configured Scheduling RNTI (CS-RNTI): for the purpose
of scheduling a semi-statically configured terminal-
specific PDSCH Random Access RNTI (RA-RNTI): for the purpose of
scheduling a PDSCH in a random access stage Paging RNTI (P-RNTI): for the purpose of scheduling a
PDSCH on which paging is transmitted System Information RNTI (SI-RNTI): for the purpose of
scheduling a PDSCH on which system information is
transmitted Interruption RNTI (INT-RNTI): for the purpose of noti-
fying of whether a PDSCH is punctured Transmit Power Control for PUSCH RNTI (TPC-
PUSCH-RNTI): for the purpose of indicating a power
control command for a PUSCH Transmit Power Control for PUCCH RNTI (TPC-
PUCCH-RNTI): for the purpose of indicating a power
control command for a PUCCH Transmit Power Control for SRS RNTI (TPC-SRS-
RNTI): for the purpose of indicating a power control
command for an SRS The DCI formats mentioned above may follow a defini-
tion as in Table 20 below.

TABLE 20

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In a 5G wireless communication system, a search space of
aggregation level L in search space set s and control resource
set p may be expressed as in an equation below.

$$L \cdot \left\{ \left( Y_{p,n_{s,f}^{\mu}} + \left\lfloor \frac{m_{s,n_{CI}} \cdot N_{CCE,p}}{L \cdot M_{p,s,max}^{(L)}} \right\rfloor + n_{CI} \right) \bmod \lfloor N_{CCE,p}/L \rfloor \right\} + i$$

L: aggregation level
nCI: carrier index
NCCE,p: the total number of CCEs existing in control
resource set p
nμs,f: slot index
M(L)p,s,max: the number of PDCCH candidates at aggre-
gation level L
msnCI=0, . . . , M(L)p,s,max−1: The indexes of PDCCH
candidates at aggregation level L
i=0 . . . , L−1

$$-Y_{p,n_{s,f}^{\mu}} = \left( A_p \cdot Y_{p,n_{s,f}^{\mu}1} \right) \bmod D, \ Y_{p,-1} = n_{RNTI} \neq 0,$$

$$A0 = 39827, A1 = 39829, A2 = 39839, D = 65537$$

nRNTI: terminal identifier
In a case of a common search space, Y_(p,nμs,f) may be
0. In a case of a terminal-specific search space, Y_(p,
nμs,f) may be changed according to a time index and
the identity (C-RNTI or ID configured for a terminal by
a base station) of a terminal.

Figure 6:
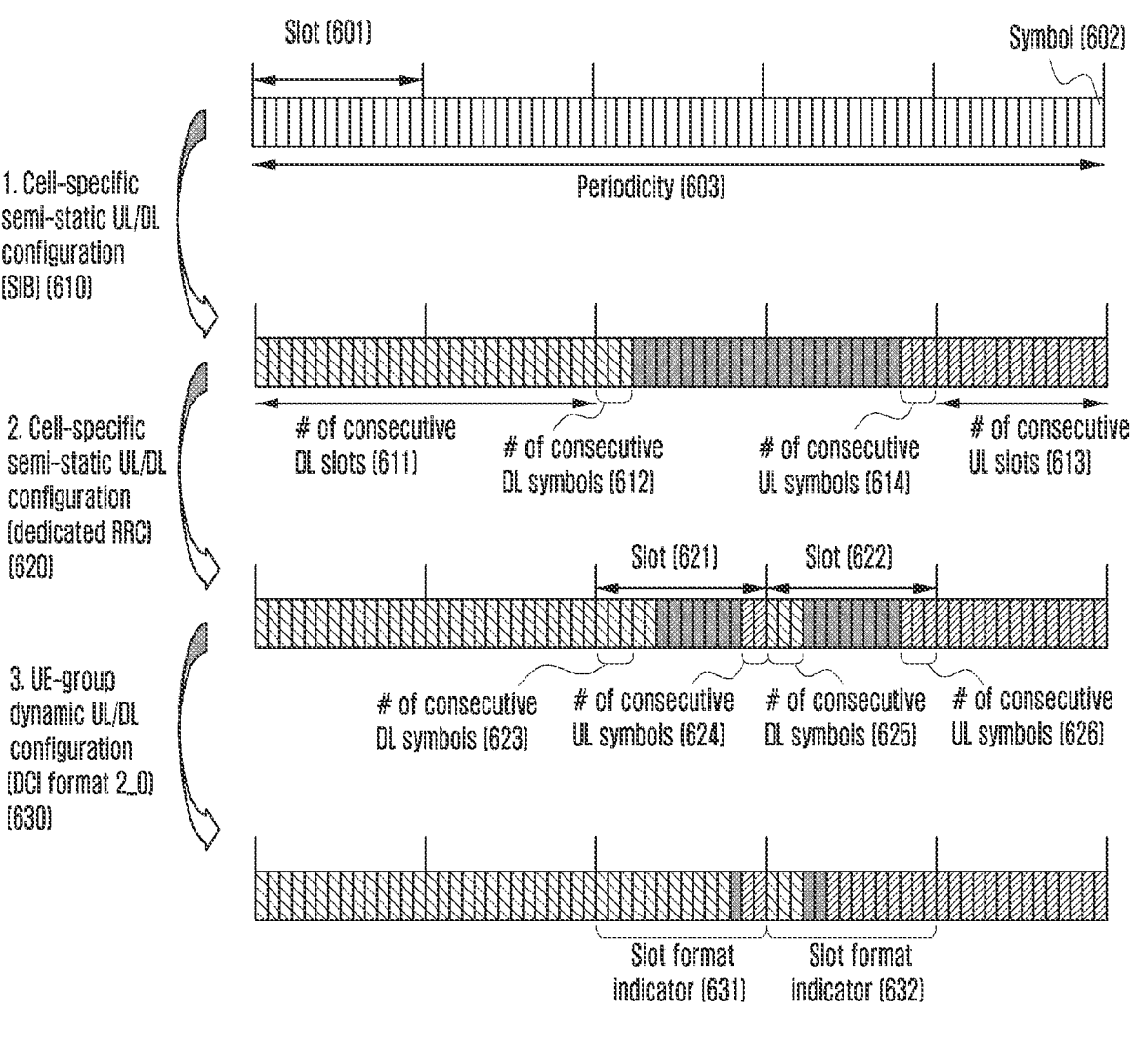
FIG. 6 illustrates an example of a method for configuring uplink and downlink resources in a 5G wireless communication system according to an embodiment of the disclosure.

FIG. 6 illustrates an example of a method for configuring
uplink and downlink resources in a 5G wireless communi-
cation system according to an embodiment of the disclosure.

Referring to FIG. 6, a slot 601 may include 14 symbols
602. In a 5G communication system, an uplink-downlink
configuration of symbols/slots may be configured in three
stages. First, uplink-downlink of symbols and/or slots may
be semi-statistically configured in the unit of symbols
through cell-specific configuration information 610 obtained
through system information. Specifically, cell-specific
uplink-downlink configuration information obtained
through system information may include uplink-downlink
pattern information and subcarrier information serving as a
criterion. A pattern period (periodicity) 603, the number 611
of consecutive downlink slots from the starting point of each
pattern and the number 612 of symbols of the next slot, and
the number 613 of consecutive uplink slots from the end of
the pattern and the number 614 of symbols of the next slot
may be indicated through the uplink-downlink pattern infor-
mation. Slots and symbols not indicated as uplink and
downlink may be determined as flexible slots and/or sym-
bols.

Second, slots 621 and 622 including the flexible slots
and/or flexible symbols may be indicated by user-specific
configuration information through dedicated higher layer
signaling to have the numbers 623 and 625 of consecutive
downlink symbols from the starting symbols of the respec-
tive slots, and the numbers 624 and 626 of consecutive
uplink symbols from the end of the respective slots, or the
entirety of each slot may be indicated to be downlink or
uplink.

In addition, lastly, in order to dynamically change a
downlink signal transmission interval and an uplink signal
transmission interval, each of symbols (i.e., not indicated as
downlink and uplink) indicated as flexible symbols in each slot may be indicated to be a downlink symbol, an uplink symbol, or a flexible symbol through a slot format indicator (SFI) 631 and 632 included in a downlink control channel. The slot format indicator shows an uplink-downlink configuration of 14 symbols in one slot as in a table below, and one index may be selected in a configured Table 21 below.

portion of downlink traffic may be used for the coverage of an actual 5G mobile communication service. In addition, coverage enhancement is a key requirement of a 5G mobile communication service because the coverage of a base station and a terminal is reduced due to the increase of center frequency for extension of a frequency band. Particularly,

TABLE 21

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | D | D | D | F | F | F | F | U |
| 54 | F | F | F | F | F | F | F | D | D | D | D | D | D | D |
| 55 | D | D | F | F | F | F | U | U | U | D | D | D | D | D |
| 56-254 | Reserved | | | | | | | | | | | | | |
| 255 | UE determines the slot format for the slot based on tdd-UL-DL-ConfigurationCommon, or tdd-UL-DL-configurationDedicated and, if any, on detected DCI formats | | | | | | | | | | | | | |

In a 5G mobile communication service, an additional coverage expansion technology has been introduced compared to an LTE communication service. However, a TDD service suitable for a service having generally a high prouplink channel coverage enhancement is a key requirement of a 5G mobile communication service in that the transmission power of a base station is generally lower than that of a terminal, a service having a high proportion of downlink traffic is required to be supported, and a ratio of downlink resources in the time domain is higher than that of uplink resources.

The coverage of an uplink channel between a base station and a terminal may be physically enhanced by using a method of increasing the time resources of an uplink channel, lowering the center frequency, or increasing the transmission power of a terminal. However, changing frequency may be limited due to a determined frequency band for each network operator. In addition, increasing the maximum transmission power of a terminal may be also limited because a value of the maximum transmission power of a terminal has been determined to reduce interference.

Therefore, in order to enhance the coverage of a base station and a terminal, uplink resources and downlink resources may be divided even in the frequency domain as in an FDD system rather than determining a ratio of resources in the time domain according to a proportion between uplink and downlink traffic in a TDD system. In an embodiment, a system enabling flexible division between uplink resources and downlink resources in the time domain and the frequency domain may be called an XDD system, a flexible TDD system, a hybrid TDD system, a TDD-FDD system, a hybrid TDD-FDD system, etc. For convenience of explanation, an XDD system will be described in the disclosure. According to an embodiment, X of XDD may mean time or frequency.

Figure 7:
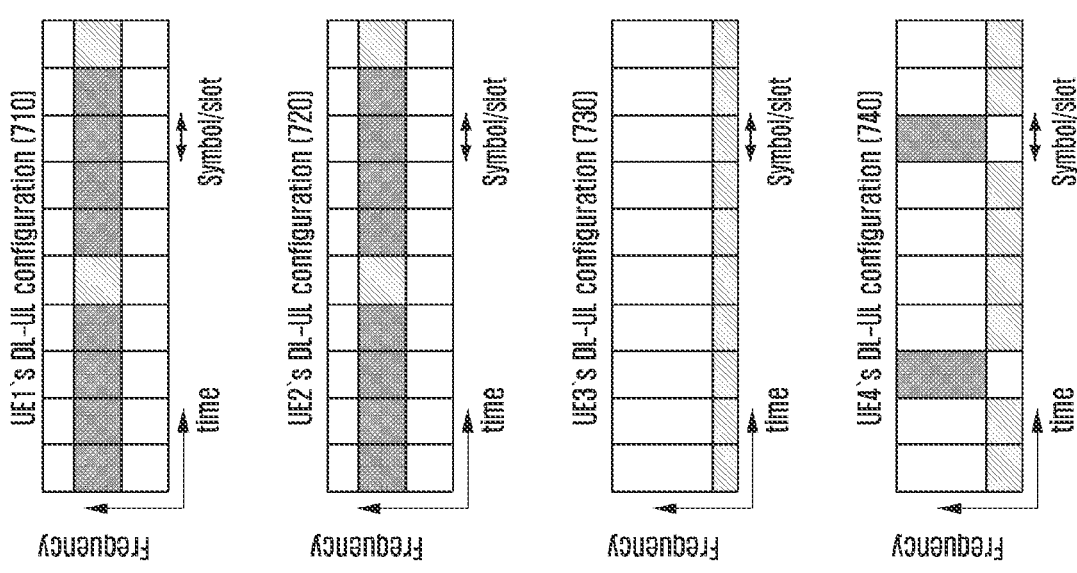
FIG. 7 illustrates an uplink-downlink configuration of an XDD system in which uplink resources and downlink resources are flexibly divided in the time domain and the frequency domain according to an embodiment of the disclosure.
Figure 7:
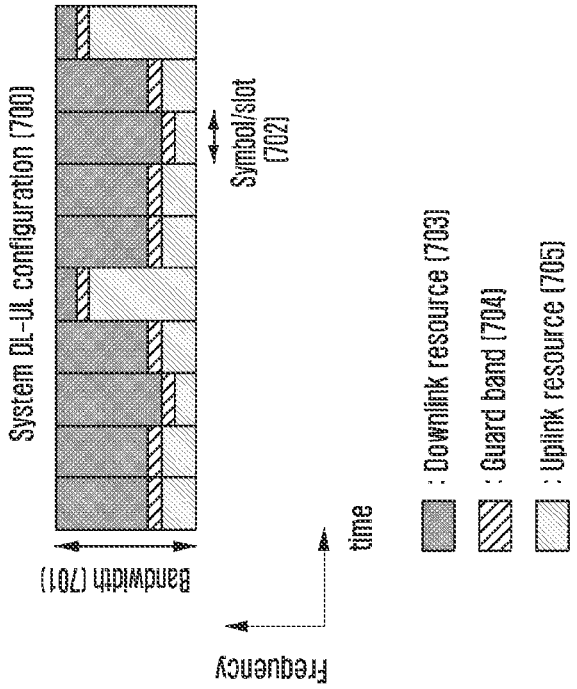

FIG. 7 illustrates an uplink-downlink configuration of an XDD system in which uplink resources and downlink resources are flexibly divided in the time domain and the frequency domain according to an embodiment of the disclosure.

Referring to FIG. 7, in view of a base station, in an uplink-downlink configuration 700 of an overall XDD system, resources may be flexibly allocated for each symbol or slot 702 according to a proportion between uplink and downlink traffic with respect to an entire frequency band 701. A guard band 704 may be allocated between the frequency bands of a downlink resource 703 and an uplink resource 705. The guard band 704 may be allocated as a method for reducing interference in reception of a signal or an uplink channel, which is caused by out-of-band emission occurring when a base station transmits a downlink channel or a signal in the downlink resource 703. For example, terminal 1 710 and terminal 2 720, the downlink traffic of which is generally greater than uplink traffic according to a configuration of a base station may be allocated downlink and uplink resources at a proportion of 4:1 in the time domain. At the same time, terminal 3 730 operating at a cell edge and thus having a lack of uplink coverage may be allocated only uplink resources in a particular time interval according to a configuration of a base station. Additionally, terminal 4 740 operating at a cell edge and thus having a lack of uplink coverage, but also having a relatively large downlink and uplink traffic may be allocated many uplink resources in the time domain for uplink coverage and may be allocated many downlink resources in the frequency domain.

As in the example described above, there is an advantage in that terminals operating relatively at the cell center and having large downlink traffic may be allocated larger downlink resources in the time domain, and terminals operating relatively at the cell edge and having a lack of uplink coverage may be allocated larger uplink resources in the time domain.

Figure 8:
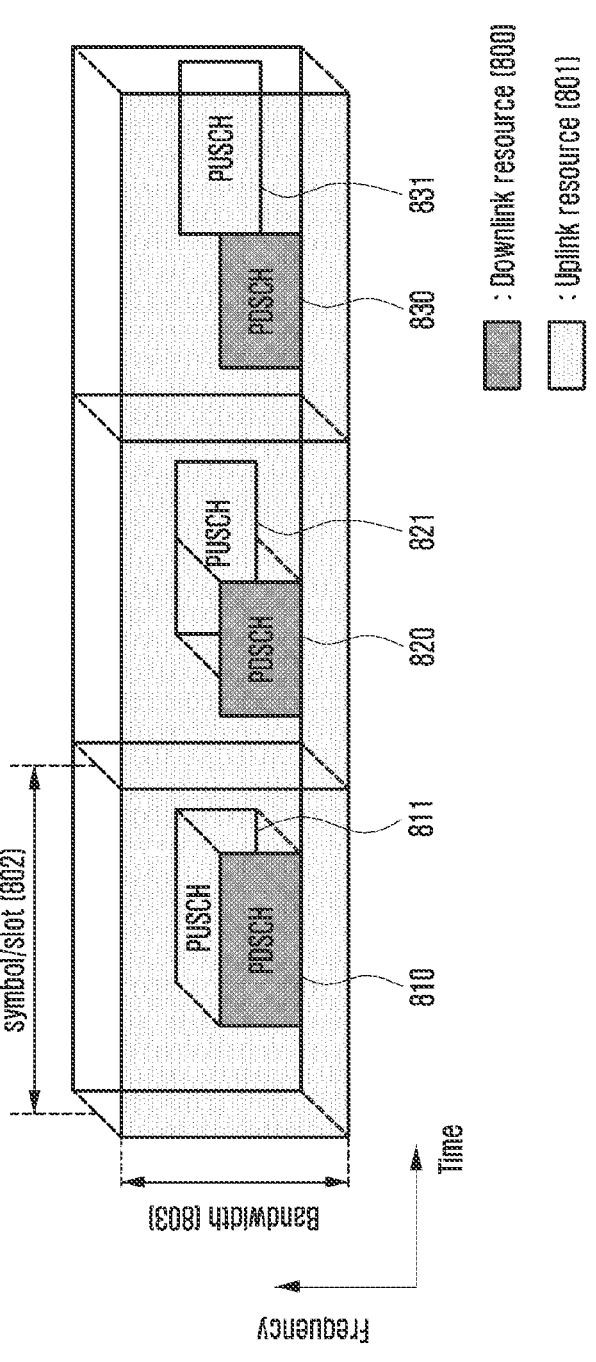
FIG. 8 illustrates an example of an uplink-downlink resource configuration of a full duplex communication system in which uplink resources and downlink resources are flexibly divided in the time domain and the frequency domain according to an embodiment of the disclosure.

FIG. 8 illustrates an example of an uplink-downlink resource configuration of a full duplex communication system in which uplink resources and downlink resources are flexibly divided in the time domain and the frequency domain according to an embodiment of the disclosure.

According to an example illustrated in FIG. 8, downlink resources 800 and uplink resources 801 may be configured to entirely or partially overlap in the time and frequency domains. In the example of FIG. 8, the downlink resources 800 and the uplink resources 801 may be configured to entirely overlap in a time resource corresponding to a symbol or slot 802 and a frequency resource corresponding to a bandwidth 803. In a region configured as the downlink resources 800, downlink transmission from a base station to a terminal may be performed, and in a region configured as the uplink resources 801, uplink transmission from a terminal to a base station may be performed. The downlink resources 800 and the uplink resources 801 overlap in the time and frequency, and thus downlink and uplink transmission/reception of a base station or a terminal may simultaneously occur in the same time and frequency resource.

Figure 9:
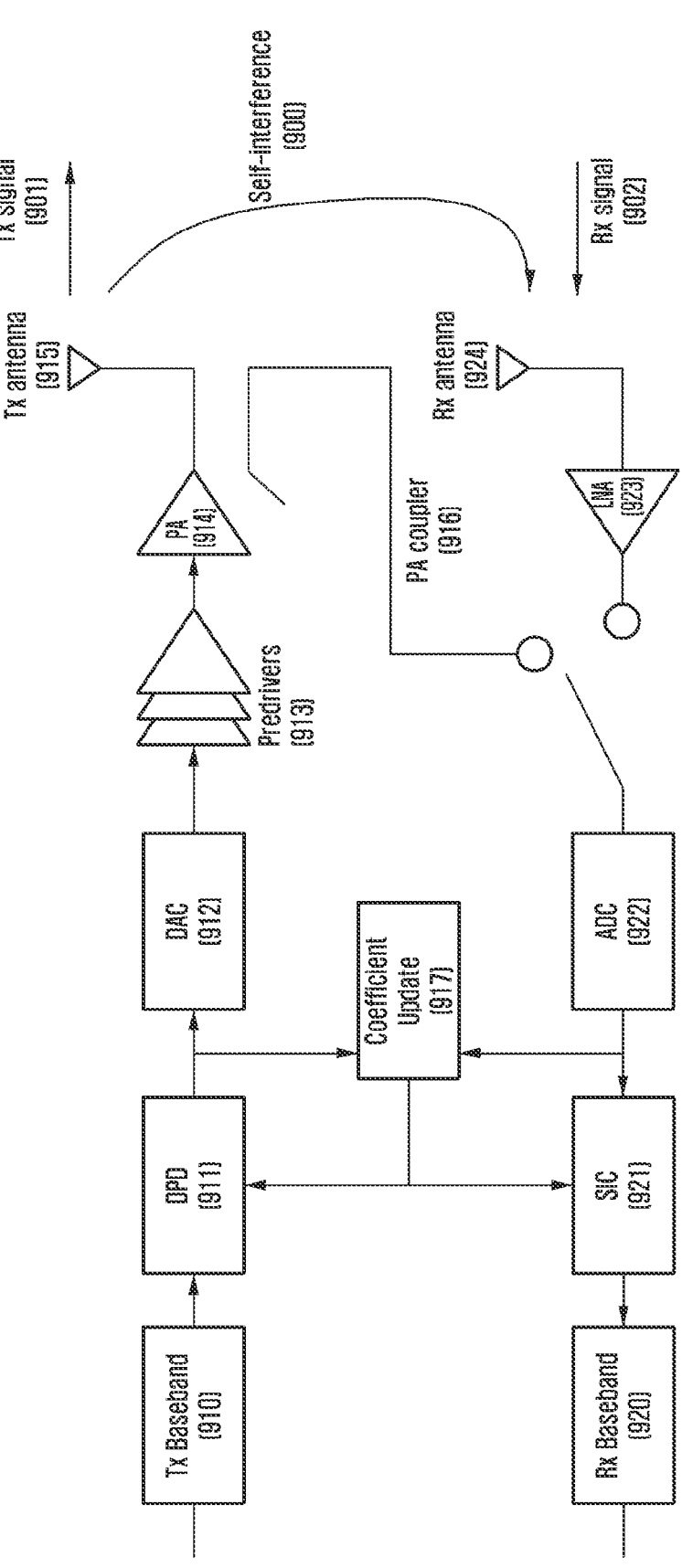
FIG. 9 illustrates a transmission/reception structure for a duplex scheme according to an embodiment of the disclosure.

FIG. 9 illustrates a transmission/reception structure for a duplex scheme according to an embodiment of the disclosure. The transmission/reception structure illustrated in FIG. 9 may be considered for a base station device or a terminal device.

According to the transmission/reception structure illustrated in FIG. 9, a transmission node may be configured by blocks, such as a transmission baseband block (Tx baseband, 910), a digital pre-distortion block (digital pre-distortion, DPD, 911), a digital-to-analog converter (DAC, 912), a pre-driver 913, a power amplifier (PA, 914), a transmission antenna (Tx antenna, 915), etc. In addition, a reception node may be configured by blocks, such as a reception antenna (Rx antenna, 924), a low noise amplifier (LNA, 923), an analog-to-digital converter (ADC, 922), a successive interference canceller 921), a reception baseband block (Rx baseband, 920), etc. In addition, a power amplifier coupler (PA coupler, 916) and a coefficient update block (coefficient update, 917) may exist for additional signal processing between the transmission node and the reception node. A role of each block may be as below in brief.

Transmission baseband block 910: A digital processing block for a transmission signal Digital pre-distortion block 911: Pre-distortion of a digital transmission signal Digital-to-analog converter 912: Conversion of a digital signal into an analog signal Pre-driver 913: Gradual power amplification of an analog transmission signal Power amplifier 914: Power amplification of an analog transmission signal Transmission antenna 915: An antenna for signal transmission Reception antenna 924: An antenna for signal reception Low noise amplifier 923: Amplification of power of an analog reception signal with minimization of noise amplification Analog-to-digital converter 922: Conversion of an analog signal into a digital signal Successive interference canceller 921: An interference canceller for a digital signal Reception baseband block 920: A digital processing block for a reception signal Power amplifier coupler 916: Observation of, by the reception node, a waveform of an analog transmission signal having passed through the power amplifier Coefficient update block 917: Update of various coefficients required for digital domain signal processing of the transmission node and the reception node, wherein calculated coefficients may be used for setting various types of parameters iy the block of DPD 911 of the transmission node and the block of SIC 921 of the reception node.

The transmission/reception structure illustrated in FIG. 9 may be used for the purpose of effectively controlling interference between a transmission signal and a reception signal in case that a base station or a terminal device simultaneously performs transmission and reception operations. For example, in case that transmission and reception simultaneously occur in a random device, a transmission signal 901 transmitted through the transmission antenna 915 of the transmission node may be received through the reception antenna 924 of the reception node, and in this case, the transmission signal 901 received by the reception node may give interference 900 in a reception signal 902 which the reception node was to receive originally. The interference between the reception signal 902 and the transmission signal 901 received by the reception node will be named self-interference 900.

For example, specifically, in case that a base station device simultaneously performs downlink transmission and uplink reception, a downlink signal transmitted by the base station may be received by a reception node of the base station, and thus interference between the downlink signal transmitted by the base station and an uplink signal that the base station was to receive at the reception node originally may occur at the reception node of the base station. In case that a terminal device simultaneously performs downlink reception and uplink transmission, an uplink signal transmitted by the terminal may be received by a reception node of the terminal, and thus interference between the uplink signal transmitted by the terminal and an downlink signal that the terminal was to receive at the reception node originally may occur at the reception node of the terminal. As described above, interference between a downlink signal and an uplink signal, that is, links having different directions in a base station and a terminal device is also named cross-link interference.

In an embodiment of the disclosure, self-interference between a transmission signal (or a downlink signal) and a reception signal (or uplink signal) may occur in a system allowing simultaneous occurrence of transmission and reception, and for example, self-interference may occur in an XDD system described above.

Figure 10:
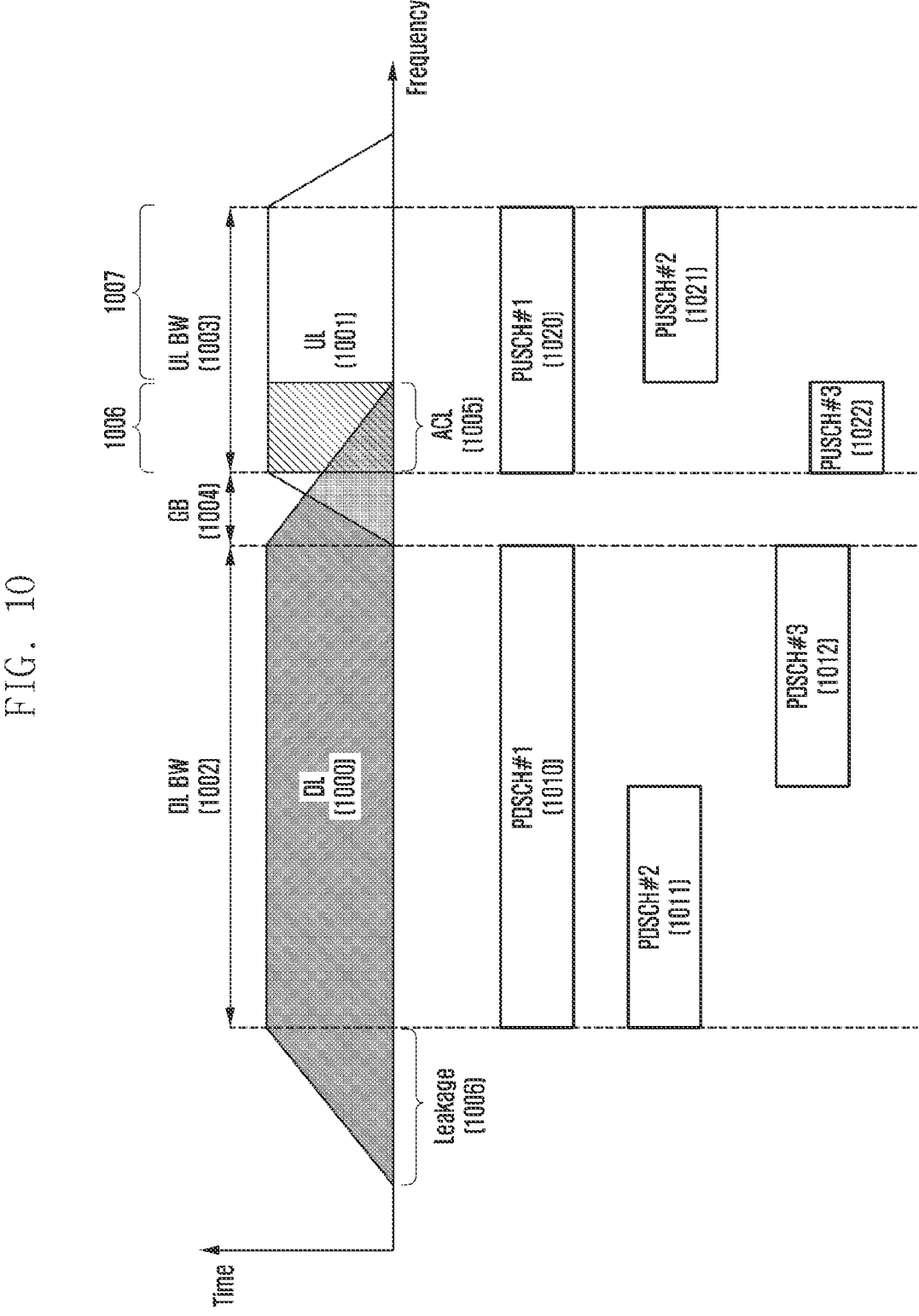
FIG. 10 illustrates an example of a downlink and uplink resource configuration in an XDD system.

FIG. 10 illustrates an example of a downlink and uplink resource configuration in an XDD system.

In a case of XDD, resources for downlink 1000 and resources for uplink 1001 may be distinguished in the frequency domain, and a guard band (GB, 1004) may exist between the resources for downlink 1000 and the resources for uplink 1001. Actual downlink transmission may be performed in a downlink bandwidth 1002, and uplink transmission may be performed in an actual uplink bandwidth 1003. A leakage 1006 may occur out of the uplink or downlink transmission band. In a region in which the downlink resources 1000 and the uplink resources 1001 are adjacent to each other, interference (this may be called an adjacent carrier leakage (ACL) 1005) caused by the leakage may occur. FIG. 10 illustrates an example in which the ACL 1005 from the downlink 1000 to the uplink 1001 occurs.

As the downlink bandwidth 1002 and the uplink bandwidth 1003 become adjacent to each other, the effect of signal interference caused by the ACL 1005 may increase, and thus performance deterioration may occur. For example, as illustrated in FIG. 10, a partial resource region 1006 in the uplink band 1003, which is adjacent to the downlink band 1002, may be largely affected by the interference caused by the ACL 1005. A partial resource region 1007 in the uplink band 1003, which is relatively far away from the downlink band 1002, may be less affected by the interference caused by the ACL 1005. That is, there are, in the uplink band 1003, the resource region 1006 relatively largely affected by interference and the resource region 1007 relatively less affected by interference.

In addition, the guard band 1004 may be inserted between the downlink bandwidth 1002 and the uplink bandwidth 1003 for the purpose of reducing performance deterioration caused by the ACL 1005. There is an advantage in that the larger the size of the guard band 1004, the smaller the interference effect caused by the ACL 1005 between the downlink bandwidth 1002 and the uplink bandwidth 1003. However, there may also be a disadvantage of degradation of resource efficiency in that the larger the size of the guard band 1004, the smaller the resources available for transmission or reception. On the contrary, there is an advantage of enhancement of resource efficiency in that the smaller the size of the guard band 1004, the larger the amount of the resources available for transmission or reception. However, there is a disadvantage in that the interference effect caused by the ACL 1005 between the downlink bandwidth 1002 and the uplink bandwidth 1003 may become large. Therefore, it may be important to determine a proper size of the guard band 1004 in consideration of a trade-off.

As another example, self-interference may occur in a full duplex system described above. As illustrated in FIG. 8, in a full duplex system, the downlink resources 800 and the uplink resources 801 may overlap with each other both in the time and frequency domains, and thus interference between downlink transmission and uplink transmission may normally occur. A resource region in which actual downlink transmission is performed in the region of the downlink resources 800 and a resource region in which actual uplink transmission is performed in the region of the uplink resources 801 may entirely or partially overlap with each other. A degree of interference between downlink transmission and uplink transmission may vary according to an overlapped shape of resources used for actual transmission. In the example illustrated in FIG. 8, PDSCHs 810, 820, and 830 may be transmitted in the downlink resources 800, and PUSCHs 811, 821, and 831 may be transmitted in the uplink resources 801. For example, a region in which the PDSCH 810 is transmitted and a region in which the PUSCH 811 is transmitted entirely overlap with each other, and thus the entirety of the PUSCH 811 may be affected by the interference of the PDSCH 810. As another example, the PDSCH 820 and the PUSCH 821 overlap in a partial transmission region, and thus some resources of the PUSCH 821 may be affected by the interference of the PDSCH 820. As another example, a region in which the PDSCH 830 is transmitted and a region in which the PUSCH 831 is transmitted do not overlap, but in case that they are transmitted in very close resource regions, power leaked from the PDSCH 830 may interfere in the PUSCH 831.

A random time and frequency resource region in which a signal is to be transmitted or received in a wireless communication system may have different received signal qualities for each time and frequency resource due to the effect of various interferences, the effect of fading channels, etc. More specifically, the following reasons allow different received signal qualities for each time or frequency resource region.

A channel state is not good in a particular time and frequency resource region, and thus received signal quality may not be good. Alternatively, a channel state is good in a particular time and frequency resource region, and thus received signal quality may be good.

Alternatively, received signal quality may not be good in a particular time and frequency resource region largely interfered with from an adjacent cell. Alternatively, received signal quality may be good in a particular time and frequency resource region which is not largely interfered with from an adjacent cell.

In case that downlink transmission and uplink transmission are simultaneously performed in a state where downlink and uplink resource regions are adjacent to each other, received signal quality may not be good in a particular time and frequency resource region (e.g., a resource region in which downlink and uplink are adjacent to each other). Alternatively, in case that downlink transmission and uplink transmission are simultaneously performed in a state where downlink and uplink resource regions are adjacent to each other, received signal quality may be relatively good in a particular time and frequency resource region (e.g., a resource region in which downlink and uplink are relatively far away from each other). A description for an interference environment in XDD described above may be referred to for this point.

Alternatively, in case that downlink transmission and uplink transmission are simultaneously performed in a state where downlink and uplink resource regions are entirely or partially overlapped, received signal quality may be good or not be good in a particular time and frequency resource region. A description for an interference environment in full duplex communication described above may be referred to for this point.

Various other reasons may also cause different received signal qualities for each time and frequency resource region.

According to an embodiment of the disclosure, signal quality may be different in parts of a time and frequency resource region in which a signal is to be transmitted or received, and accordingly, a problem of inefficiency may occur in a method for scheduling some transmission signals.

For example, in the example illustrated in FIG. 10, the region 1006 (or a region having a low received signal quality) relatively largely interfered with from downlink and the region 1007 (or a region having a high received signal quality) relatively less interfered with therefrom may exist in the uplink bandwidth 1003. In a case of transmitting one PUSCH over the entire uplink bandwidth 1003, that is, in a case of transmitting a PUSCH over the region 1006 and the region 1007, control of the MCS and the transmission power of the PUSCH to be transmitted may be largely restricted by the region 1006. For example, the region 1006 has a bad received signal quality, and thus a relatively low MCS (e.g., a low order modulation scheme such as quadrature phase shift keying (QPSK)) may be preferred therein, and the region 1007 has a good received signal quality, and thus a relatively high MCS (e.g., a high order modulation scheme such as 64 quadrature amplitude modulation (QAM)) may be preferred therein. In case that one PUSCH is transmitted over the region 1006 and the region 1007, in order to satisfy a performance for a required error rate, a PUSCH may be required to be transmitted by using a low MCS corresponding to the region 1006. Accordingly, a problem may occur in that a data transmission rate may actually decreases.

In the example illustrated in FIG. 10, the amount of self-interference affected to uplink reception by downlink transmission may vary according to scheduling information of a downlink channel and an uplink channel that are actually transmitted or received, for example, time and frequency resource allocation positions, an MCS level used for transmission or reception, or power allocation information used in transmission or reception. FIG. 10 illustrates an example in which the size of self-interference may vary according to a frequency resource allocation position. For example, as the frequency resource position at which an actually transmitted PDSCH is mapped gets closer to the frequency resource position at which an actually received PUSCH is mapped, the size of self-interference experienced by the actually received PUSCH may be large. On the contrary, as the frequency resource position at which an actually transmitted PDSCH is mapped goes away from the frequency resource position at which an actually received PUSCH is mapped, the size of self-interference experienced by the actually received PUSCH may be small. As another example, as the size of the bandwidth of the frequency resource to which an actually transmitted PDSCH is mapped gets larger, the size of self-interference experienced by an actually received PUSCH may be large. On the contrary, as the size of the bandwidth of the frequency resource to which an actually transmitted PDSCH is mapped gets smaller, the size of self-interference experienced by an actually received PUSCH may be small.

In the example of FIG. 10, in case that transmission and reception of PDSCH #1 1010 and PUSCH #1 1020 are simultaneously performed, PDSCH #1 1010 has a very large bandwidth and is mapped and transmitted in a frequency resource region very adjacent to actual uplink reception, and thus the size of self-interference experienced by PUSCH #1 1020 may be very large. On the contrary, in case that in the example of FIG. 10, transmission and reception of PDSCH #2 1011 and PUSCH #2 1021 are simultaneously performed, PDSCH #2 1011 has a relatively small bandwidth and is mapped and transmitted in a frequency resource region relatively far away from actual uplink reception, and the size of self-interference experienced by PUSCH #2 1021 may be relatively small. Therefore, a base station may determine a self-interference effect according to simultaneous transmission and reception for uplink and downlink in consideration of scheduling information of actual uplink and downlink physical channels, and accordingly, may suitably control a scheduling operation.

As another example, in a full duplex communication system as in the example illustrated in FIG. 8, a degree of interference may vary according to resource allocation information of a PDSCH and a PUSCH (i.e., whether resources allocated in the time and frequency domains overlap with each other). A PDSCH and a PUSCH being scheduled and then transmitted may be dynamically changed, and thus it may be difficult for a base station to schedule each data in consideration of an amount of interference for every scheduling.

In a more detailed example, a base station may schedule the PUSCH 821 in advance, and then determine scheduling for the PDSCH 820. Interference may occur in the earlier scheduled PUSCH 821, and thus a received signal quality for the PUSCH 821 may degrade, and a performance for a required error rate may fail to be satisfied accordingly. In order to prevent this problem, a base station may conservatively adjust the MCS and the transmission power of the PUSCH 821 in consideration of interference by the PDSCH 820, which may occur later. For example, the base station may apply a low MCS (e.g., a low order modulation scheme such as QPSK) to the PUSCH 821 in consideration of interference by the PDSCH 820, which may occur later. However, there is a disadvantage of lowering an expected data transmission rate.

An embodiment of the disclosure proposes an effective transmission signal scheduling method considering a case where signal qualities are different from each other in parts of a time and frequency resource region in which a signal is to be transmitted or received.

Hereinafter, higher layer signaling may be signaling corresponding to at least one of the signalings below, or a combination of one or more thereof.

Master information block (MIB)

System information block (SIB) (or SIB X (X=1, 2, . . . )

Radio resource control (RRC)

Medium access control (MAC) control element (CE)

UE capability reporting

UE assistance information or message (UE assistance information message)

In addition, L1 signaling may be signaling corresponding to at least one of the physical layer channels or signaling methods below, or a combination of one or more thereof.

Physical downlink control channel (PDCCH)

Downlink control information (DCI)

UE-specific DCI

Group common DCI

Common DCI

Scheduling DCI (e.g., DCI used for scheduling downlink or uplink data)

Non-scheduling DCI (e.g., DCI not for scheduling downlink or uplink data)

Physical uplink control channel (PUCCH)

Uplink Control Information (UCI)

First Embodiment

In an embodiment of the disclosure, an MCS used for scheduling a data channel for each time and frequency resource may be differently applied.

Figure 11:
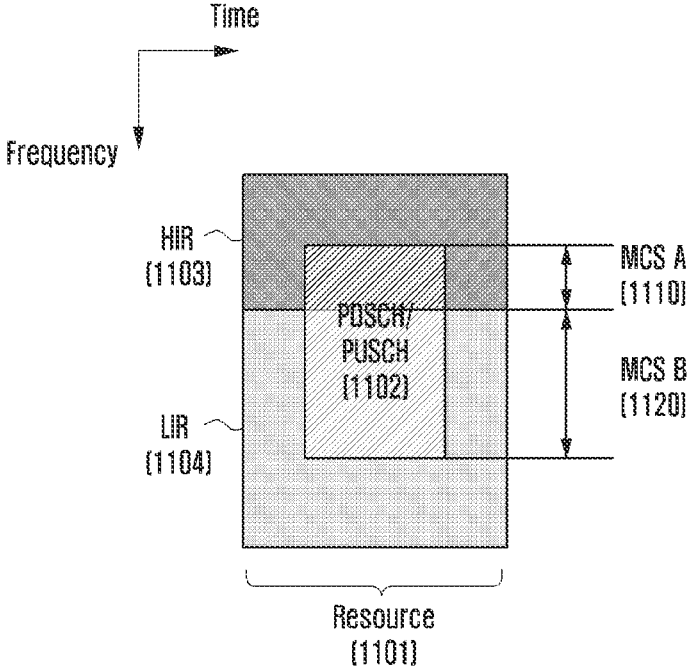
FIG. 11 illustrates an example of a method for scheduling a data channel (PDSCH or PUSCH) according to an embodiment of the disclosure.

FIG. 11 illustrates an example of a method for scheduling a data channel (PDSCH or PUSCH) according to an embodiment of the disclosure.

An entire time and frequency resource region 1101 in which a data channel is able to be scheduled is illustrated. A partial region of the entire resource 1101 is classified as a region (high interference resource (HIR) 1103) relatively largely affected by interference (or a region in which a low received signal quality is expected in the same way), and another partial region may be classified as a region (low interference resource (LIR) 1104) relatively less affected by interference (or a region in which a low received signal quality is expected in the same way). In an example of FIG. 11, a random data channel (PDSCH or PUSCH) is scheduled in a resource region over the HIR 1103 and the LIR 1104. In an embodiment of the disclosure, different MCSs may be applied in a resource region overlapping with the HIR 1103 and a resource region overlapping with the LIR 1104 in a resource region in which a data channel 1102 is mapped and transmitted. For example, MCS A 1110 may be applied in the region in which the scheduled data channel 1102 overlaps with the HIR 1103, and MCS B 1120 may be applied in the region in which the scheduled data channel 1102 overlaps with the LIR 1104.

MCS A 1110 may correspond to a relatively low MCS, and the relatively low MCS may be defined as an MCS corresponding to a relatively low MCS index in the above MCS index table, an MCS in which relatively low order modulation is applied, or an MCS in which a relatively low code rate is applied.

MCS B 1120 may correspond to a relatively high MCS, and the relatively high MCS may be defined as an MCS corresponding to a relatively high MCS index in the above MCS index table, an MCS in which relatively high order modulation is applied, or an MCS in which a relatively high code rate is applied.

In an embodiment of the disclosure, a particular time and frequency resource, such as the HIR 1103 or the LIR 1104, which is configured for a terminal in order to differently adjust an MCS for a scheduled data channel is named resource A. That is, a base station may configure resource A for a terminal, and the terminal may determine whether resource A overlaps with a resource region of a scheduled data channel, assume different MCSs, and then decode the data channel.

In an embodiment of the disclosure, a base station may configure or indicate, for or to a terminal, one or multiple resources A through higher layer signaling (e.g., MIB, SIB, RRC signaling) or L1 signaling (e.g., DCI). For example, the base station may configure one or multiple resources A for the terminal through RRC signaling. Resource A configured through RRC signaling may be activated as soon as being configured. Alternatively, whether to activate resource A configured through RRC signaling may be additionally notified of to the terminal through MAC CE or DCI. The base station and the terminal may differently adjust an MCS for a data channel with respect to the activated resource A.

In an embodiment of the disclosure, the terminal may receive configuration information and activation information for resource A from the base station, as described above. The terminal may receive a DCI format through a PDCCH, and obtain scheduling information for a data channel scheduled by the DCI format. The terminal may determine, based on the scheduling information for the data channel, whether a resource region in which the data channel is transmitted overlaps with a resource region corresponding to the pre-configured and activated resource A.

In an embodiment of the disclosure, the terminal may determine, by using various methods, an MCS for a data channel in a region in which a resource region in which a data channel is transmitted overlaps with a resource region corresponding to resource A, and in a region in which a resource region in which a data channel is transmitted does not overlap with a resource region corresponding to resource A. For example, the following methods may be considered.

[Method 1]

An MCS index for a region in which a resource region in which a data channel is transmitted overlaps with resource A may be determined by an MCS index value obtained by subtracting a particular offset value from an MCS index indicated by a DCI format.

More specifically, a terminal may receive one MCS index value for a corresponding data channel through a DCI format scheduling the corresponding data channel. For example, the terminal may receive an MCS index value of X for a data channel. An MCS index value received through a DCI format may be applied to a data channel not overlapping with resource A. The terminal may assume an index value of Y ($<$X) smaller than a received MCS index value of X for a region in which a transmission region of a corresponding data channel and resource A overlap with each other. The Y value may be determined by a function for an MCS index value of X received through a DCI format. For example, Y may correspond to an MCS index lower than X by a particular offset Δ, that is, Y=X−Δ. The offset Δ value may be defined in advance. Alternatively, a base station may configure the same value for the terminal through higher layer signaling. Alternatively, the base station may indicate the same value to the terminal through a DCI format.

In case that one data channel overlaps with multiple resources A, for example, resource A1, resource A2, . . . , and resource AN, different offset values A1, A2, . . . , and AN may be applied to respective resource regions of the data channel, which overlap with resources A (or resource A groups configured by multiple resources A), or the same offset value Δ may be applied thereto, whereby MCS index values Y1, Y2, . . . , and YN may be determined. The i-th offset value Δi may be used to determine an MCS index value of Yi in a data channel resource region overlapping with the i-th resource A (or i-th resource A group).

[Method 2]

An MCS index for a region in which a resource region in which a data channel is transmitted overlaps with resource A may be additionally indicated by a DCI format.

More specifically, a terminal may receive one or multiple MCS index values for a corresponding data channel through a DCI format scheduling the corresponding data channel. For example, the terminal may receive multiple MCS index values of X1, X2, . . . , and XN for a data channel. In case that one data channel overlaps with multiple resources A, for example, resource A1, resource A2, . . . , and resource AN, multiple MCS index values of X1, X2, . . . , and XN received through a DCI format may be mapped to respective resource regions of the data channel, which overlap with resources A (or resource A groups configured by multiple resources A). The i-th MCS index value of Xi may correspond to an MCS index value in a data channel resource region overlapping with the i-th resource A (or i-th resource A group). In addition, the terminal may obtain an MCS index value of X0 from the corresponding DCI format, and determine an MCS in a data channel resource region not overlapping with resource A therefrom.

[Method 3]

An MCS index for a region in which a resource region in which a data channel is transmitted overlaps with resource A may be additionally indicated by a DCI format, and an MCS table to be used in the overlapping region may independently exist.

More specifically, a terminal may receive one or multiple MCS index values for a corresponding data channel through a DCI format scheduling the corresponding data channel. For example, the terminal may receive multiple MCS index values of X1, X2, . . . , and XN for a data channel. The respective MCS index values may correspond to index values in different MCS tables. For example, there may exist multiple MCS tables of MCS_Table_1, MCS_Table_2, . . . , and MCS_Table_N, and the i-th MCS index value of Xi may correspond to a particular index value in the i-th MCS table of MCS_Table_i. Multiple MCS tables may be defined in advance, or may be explicitly configured by a base station for the terminal through higher layer signaling. In case that one data channel overlaps with multiple resources A, for example, resource A1, resource A2, . . . , and resource AN, multiple MCS index values of X1, X2, . . . , and XN received through a DCI format may be mapped to respective resource regions of the data channel, which overlap with resources A (or resource A groups configured by multiple resources A). The i-th MCS index value of Xi may correspond to an MCS index value in a data channel resource region overlapping with the i-th resource A (or i-th resource A group). The MCS index value of Xi may correspond to an index value in the i-th MCS index table of MCS_Table_i. In addition, the terminal may receive an MCS index value of X0 from the corresponding DCI format, and determine an MCS in a data channel resource region not overlapping with resource A therefrom.

In an embodiment of the disclosure, the above methods may be combined to be used.

Figure 12A:
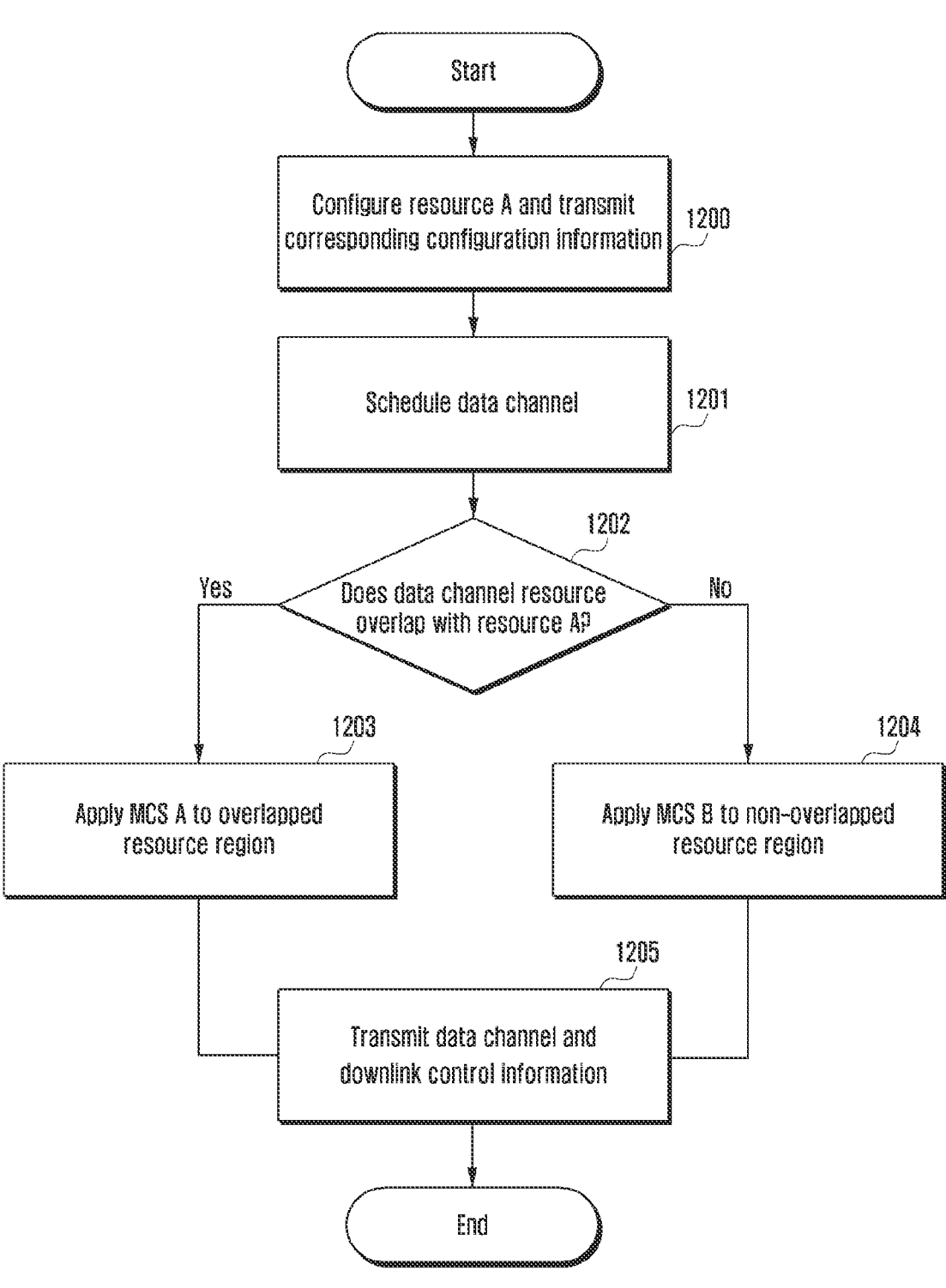
FIG. 12A illustrates a base station operation according to an embodiment of the disclosure.

FIG. 12A illustrates a base station operation according to an embodiment of the disclosure.

A base station may, in operation 1200, configure resource A and transmit corresponding configuration information to a terminal. The base station may, in operation 1201, schedule a data channel. The base station may, in operation 1202, determine whether a transmission resource of the scheduled data channel and resource A overlap with each other. The base station may, in operation 1203, apply MCS A to the data channel existing in the region overlapping with resource A, and may, in operation 1204, apply MCS B to the data channel not overlapping with resource A. The base station may, in operation 1205, transmit, to the terminal, the data channel and downlink control information (DCI) including scheduling information for the data channel.

FIG. 12B illustrates a terminal operation according to an embodiment of the disclosure.

A terminal may, in operation 1210, receive a configuration for resource A from a base station. The terminal may, in operation 1211, receive downlink control information from the base station, and may, in operation 1212, obtain scheduling information for a data channel from the received downlink control information. The terminal may, in operation 1213, determine whether a transmission resource of the scheduled data channel and pre-configured resource A overlap with each other. The terminal may, in operation 1214, determine MCS A for the data channel in the region overlapping with resource A through the above various methods, and may, in operation 1215, determine MCS B for the data channel in the region not overlapping with resource A through the above various methods. The terminal may, in operation 1216, decode the data channel, based on MCS values differently assumed for respective resource regions.

According to an embodiment of the disclosure, a description of the above embodiment may be applied in a random activated bandwidth.

Second Embodiment

In an embodiment of the disclosure, an MCS used for scheduling a data channel for each time and frequency resource may be differently applied.

In an embodiment of the disclosure, a terminal may receive configuration information and activation information for resource A from a base station, as described above. The terminal may receive a DCI format through a PDCCH, and obtain scheduling information for a data channel scheduled by the DCI format. The terminal may determine, based on the scheduling information for the data channel, whether a resource region in which the data channel is transmitted corresponds to pre-configured and activated resource A.

In an embodiment of the disclosure, the base station and the terminal may perform transmission or reception under the assumption of different MCS tables according to whether a resource region in which a data channel is transmitted corresponds to resource A. Referring to FIG. 11, for example, MCS table A may be used to determine an MCS in the HIR 1103, and MCS table B may be used to determine an MCS in the LIR 1104. That is, when a data channel is transmitted in the region of the HIR 1103, MCS A 1110 of the data channel may be determined based on MCS table A, and when a data channel is transmitted in the region of the LIR 1104, MCS B 1120 of the data channel may be determined based on MCS table B.

The following methods may be considered as a method for configuring or determining different MCS tables for respective resource regions.

[Method 1]

Different MCS tables may be explicitly configured for respective resource regions. More specifically, one or multiple resources A, for example, resource A1, resource A2, . . . , and resource AN may be configured for a terminal by a base station, and one or multiple MCS tables of MCS_Table_1, MCS_Table_2, . . . , and MCS_Table_N to be used for respective resources A may be configured. The i-th MCS_Table_i may be used in the i-th resource $\Delta i$.

[Method 2]

MCS sub-tables (i.e., each table configured by a group of some entries in the entire MCS table) configured by different indexes in one MCS table may be used for respective resource regions. More specifically, one or multiple resources A, for example, resource A1, resource A2, . . . , and resource AN may be configured for a terminal by a base station, one MCS table may be divided into multiple MCS sub-tables of MCS_SubTable_1, MCS_SubTable_2, . . . , and MCS_SubTable_N, and MCS sub-tables to be used for respective resources A may be mapped and then be used. The i-th MCS_SubTable_i may be used in the i-th resource $\Delta i$. Configuration information for MCS sub-tables may be explicitly configured by a base station for a terminal through higher layer signaling, may be defined in advance, or may be implicitly determined by a different system parameter value (e.g., the number of configured resources A).

[Method 3]

An MCS table may be determined by a method corresponding to a combination of method 1 and method 2. The j-th MCS sub-table of the i-th MCS table may be used in the k-th resource A.

Figure 13A:
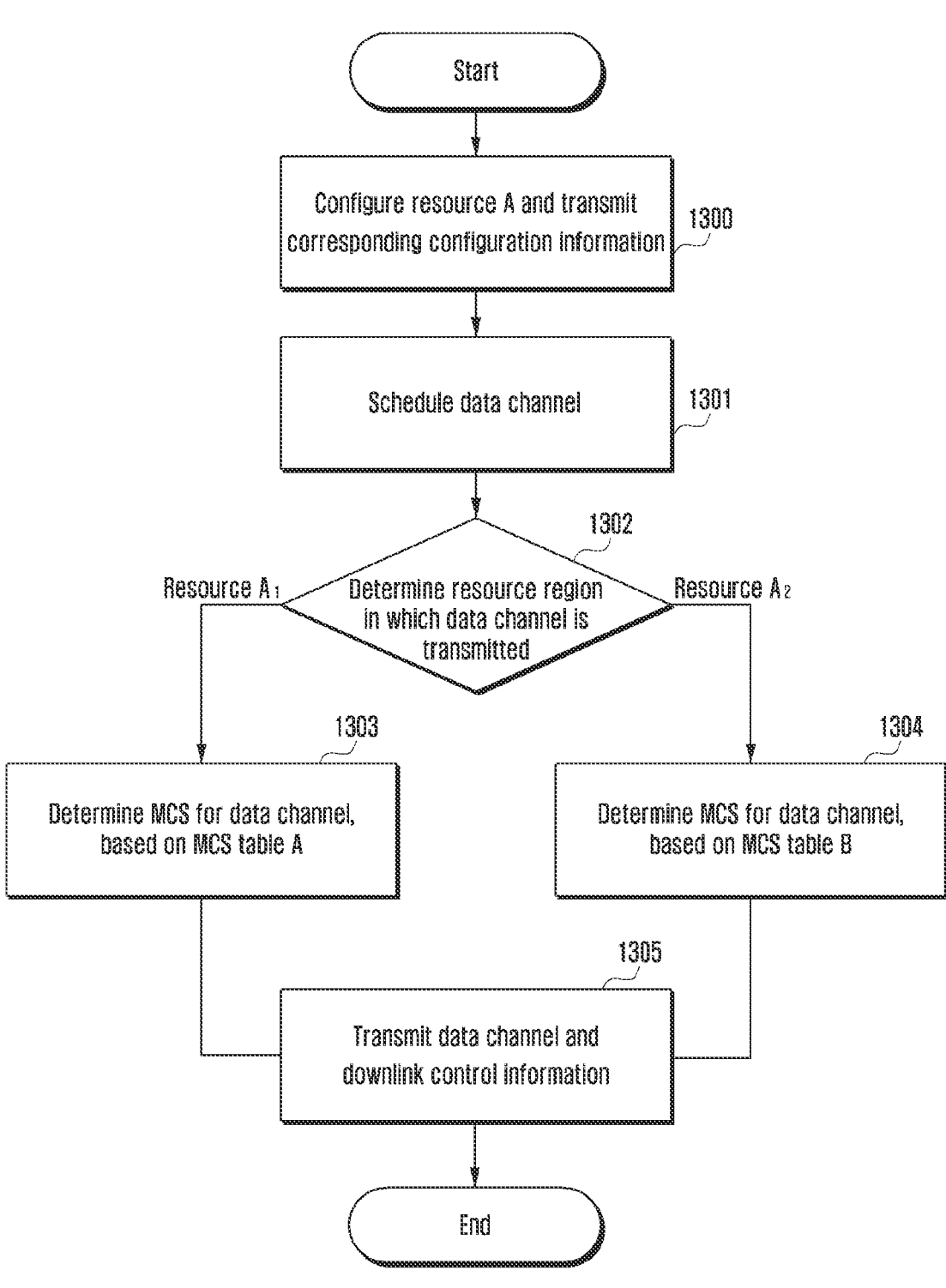
FIG. 13A illustrates a base station procedure according to an embodiment of the disclosure.

FIG. 13A illustrates a base station procedure according to an embodiment of the disclosure.

A base station may, in operation 1300, transmit, to a terminal, configuration information for one or multiple resources A (e.g., resource A1 and resource A2). The base station may, in operation 1301, schedule a data channel. The base station may, in operation 1302, determine resource A corresponding to a resource region in which the data channel is transmitted (for example, whether the resource region corresponds to resource A1 or resource A2). If it is determined that the data channel is transmitted in the resource A1 region, the base station may, in operation 1303, determine MCS A, based on MCS table A defined to be used in resource A1. If it is determined that the data channel is transmitted in the resource A2 region, the base station may, in operation 1304, determine MCS B, based on MCS table B defined to be used in resource A2. The base station may, in operation 1305, transmit, to the terminal, the data channel and downlink control information (DCI) including scheduling information (resource allocation information and MCS information) for the data channel.

Figure 13B:
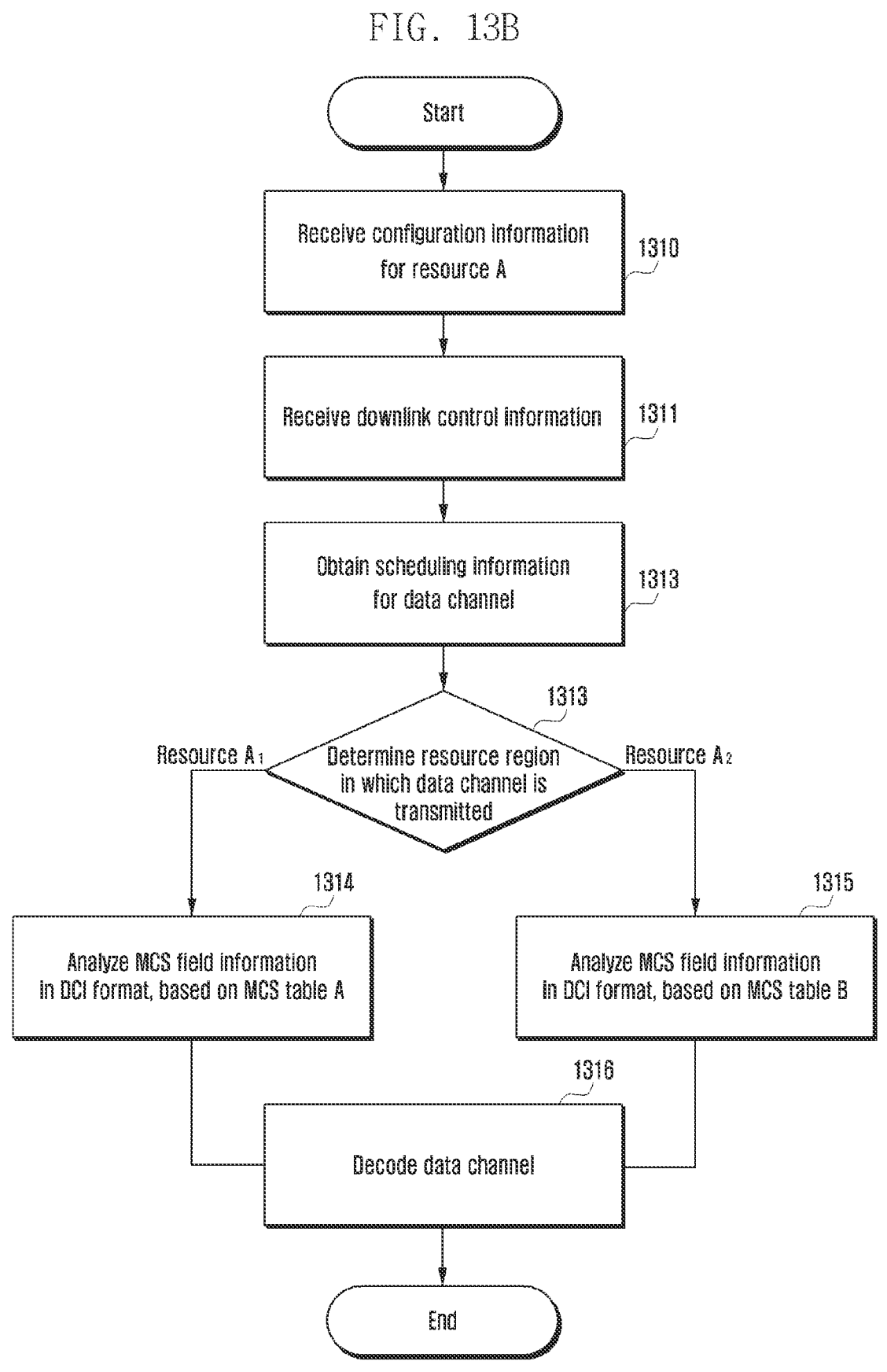

FIG. 13B illustrates a terminal procedure according to an embodiment of the disclosure.

Next, in the terminal procedure, a terminal may, in operation 1310, receive configuration information for one or multiple resources A (e.g., resource A1 and resource A2) from a base station. The terminal may, in operation 1311, receive downlink control information. The terminal may, in operation 1312, obtain scheduling information for a data channel, that is, resource allocation information. The terminal may, in operation 1313, determine resource A corresponding to a resource region in which the data channel is transmitted (for example, whether the resource region corresponds to resource A1 or resource A2). If it is determined that the data channel has been transmitted in the resource A1 region, the terminal may, in operation 1314, determine MCS A by analyzing MCS field information in a DCI format, based on MCS table A defined to be used in resource A1. If it is determined that the data channel has been transmitted in the resource A2 region, the terminal may, in operation 1315, determine MCS B by analyzing MCS field information in a DCI format, based on MCS table B defined to be used in resource A2. The terminal may, in operation 1316, decode the corresponding data channel.

According to an embodiment of the disclosure, a description of the above embodiment may be applied in a random activated bandwidth.

Third Embodiment

According to an embodiment of the disclosure, in case that a pre-scheduled data channel overlaps with pre-configured resource A, an MCS may be dynamically changed through additional signaling.

Referring to the drawing illustrated in FIG. 8, for example, a base station may schedule a PUSCH in a random slot n+K for a terminal, and DCI including scheduling information for the PUSCH may be transmitted in slot n. In the example of FIG. 8, the slot in which the PUSCH 811 is scheduled is assumed to be slot n+K under the assumption that a base station has scheduled the PUSCH 811 for a terminal. Thereafter, the base station schedules the PDSCH 810 for a random terminal in slot n+K. In case that the PDSCH 810 overlaps with the PUSCH 811, interference from downlink to uplink occurs, and thus the pre-scheduled PUSCH 811 is affected by the interference and thus may not be smoothly received.

An embodiment of the disclosure proposes, in addition to the above example, a method for dynamically changing an MCS for a pre-scheduled data channel in case that the data channel overlaps with a resource region (or a resource region having a bad received signal quality) in which large interference exists under a situation where the effect of interference or received signal quality is changeable dynamically. To this end, a base station may transmit an "MCS change indicator" to a terminal, and the MCS change indicator may dynamically change an MCS for a data channel overlapping with resource A.

In an embodiment of the disclosure, a pre-scheduled data channel may include, for example, the following scheduled data channels.

A data channel scheduled at a random time point

A data channel scheduled in a cross-slot (a cross-slot implies a case where a slot offset value is indicated to be greater than 0 in scheduling information for a PDSCH or PUSCH)

A data channel transmitted over multiple slots (e.g., a data channel scheduled to be repetitively transmitted in the unit of slots or symbols)

A data channel that has been semi-statically pre-scheduled (e.g., a semi-persistent scheduling (SPS) PDSCH or a configured grant (CG) PUSCH)

In an embodiment of the disclosure, a base station may configure one or multiple resources A for a terminal through higher layer signaling, and in a case where a pre-scheduled random data channel overlaps with corresponding resource A, the base station may additionally transmit an MCS change indicator indicating whether to change an MCS through higher layer signaling or L1 signaling. Resource A may be configured for the terminal by the base station through higher layer signaling, and the terminal may additionally receive the MCS change indicator. The terminal may finally determine an MCS for the data channel overlapping with resource A, based on contents indicated by the MCS change indicator.

In an embodiment of the disclosure, the MCS change indicator may be indicated in a type of a common DCI format (a DCI format transmitted in a common search space), a group-common DCI format (a DCI format transmitted in, for example, a type-3 common search space), a terminal-specific DCI format (e.g., a DCI format transmitted in a terminal-specific search space), a scheduling DCI format (a DCI format including scheduling information for a data channel), or a non-scheduling DCI format (a DCI format not including scheduling information for a data channel).

In an embodiment of the disclosure, the MCS change indicator may indicate whether to change an MCS for one resource A or a resource A group configured by multiple resources A. In an embodiment of the disclosure, the MCS change indicator may be configured by a bitmap having a bit size of one bit for each resource A or resource A group.

In an embodiment of the disclosure, how to change an MCS according to the MCS change/non-change indicator may be configured for the terminal by the base station in advance or may follow a pre-defined method. For example, in case that, in operation 1401, a predetermined MCS in scheduling information for a data channel is MCS A, if an MCS change indicator indicates MCS change, the MCS for the data channel may be changed from MCS A to MCS B. In an embodiment of the disclosure, the changed MCS B may correspond to a relatively low MCS index (or a low order MCS or an MCS having a low code rate) compared to existing MCS A. In addition, the method may be carried out by being combined with various embodiments of an MCS change method (i.e., a method of determining MCS B) described in the first embodiment and the second embodiment of the disclosure.

In an embodiment of the disclosure, the MCS of a data channel at a random time point may be determined based on the contents of an MCS change indicator.

In an embodiment of the disclosure, the MCS of the entire data channel may be determined based on an MCS change indicator. That is, in case that the entirety or a part of a data channel overlaps with resource A, and an MCS change indicator indicates MCS change, the MCS of the entirety of the data channel may be changed.

In an embodiment of the disclosure, the MCS of a part of a data channel may be determined based on an MCS change indicator. That is, in case that the entirety or a part of a data channel overlaps with resource A, and an MCS change indicator indicates MCS change, the MCS of a resource region actually overlapping with resource A in the entire resource region of the data channel may be changed, and the MCS of a resource region not overlapping with resource A may be maintained as the existing MCS.

In an embodiment of the disclosure, a base station and a terminal may transmit or receive a data channel, based on the contents of an MCS change/non-change indicator. For example, in downlink, a base station may transmit, to a terminal, a PDSCH, the MCS of which has been changed or maintained, based on the contents of an MCS change indicator. As another example, in uplink, a terminal may transmit, to a base station, a PUSCH, the MCS of which has been changed or maintained, based on the contents of an MCS change indicator.

Figure 14A:
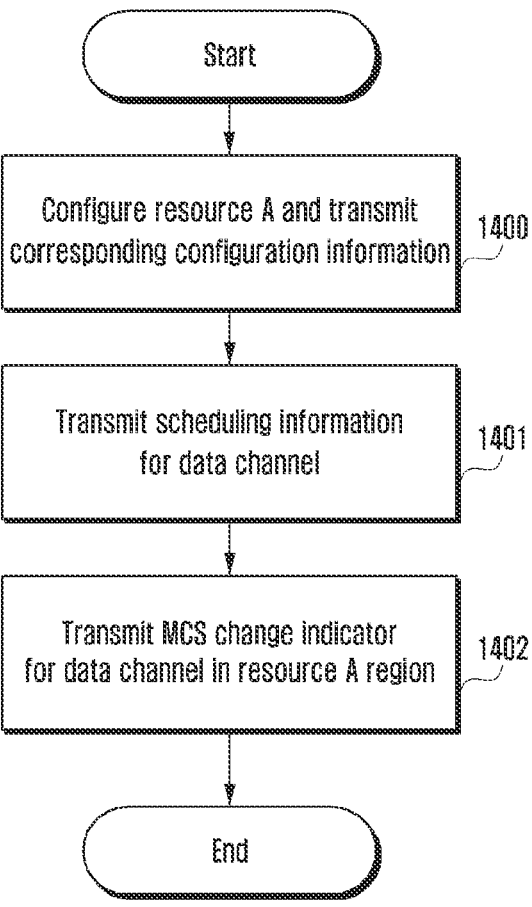
FIG. 14A illustrates a base station procedure according to an embodiment of the disclosure.

FIG. 14A illustrates a base station procedure according to an embodiment of the disclosure.

A base station may, in operation 1400, transmit configuration information for one or multiple resources A to a terminal through higher layer signaling (e.g., MIB, SIB, RRC, MAC CE signaling, etc.). The base station may, in operation 1401, schedule a data channel, and transmit corresponding scheduling information to the terminal through higher layer signaling, L1 signaling, or a combination of higher layer signaling and L1 signaling. The base station may, in operation 1402, transmit an MCS change indicator for the data channel in a resource A region through higher layer signaling (e.g., MAC CE) or L1 signaling (e.g., DCI). In case that the pre-scheduled data channel overlaps with the region corresponding to resource A, the base station may indicate, to the terminal through an MCS change indicator, whether or not to change an MCS for the data channel.

Figure 14B:
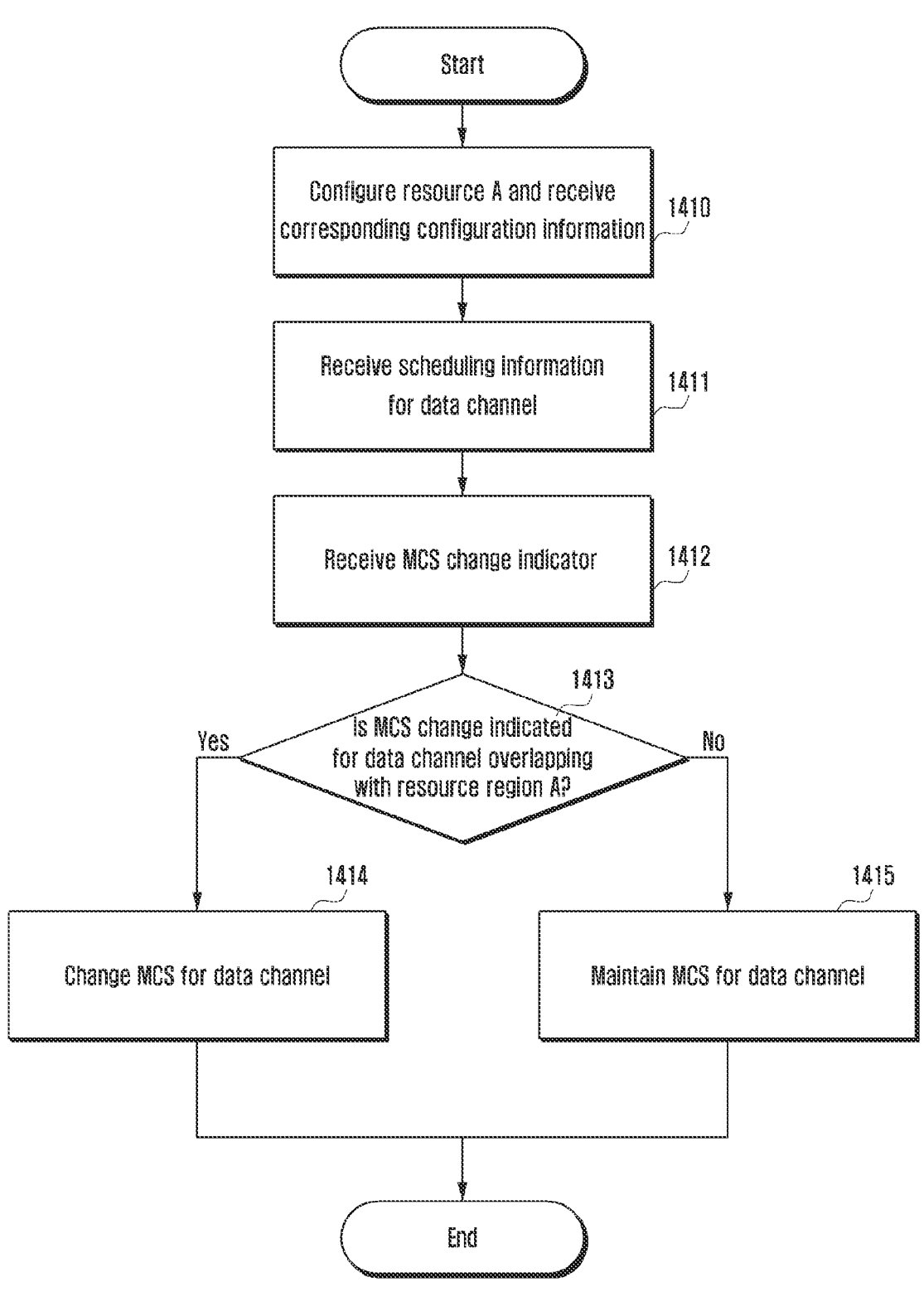
FIG. 14B illustrates a terminal procedure according to an embodiment of the disclosure.

FIG. 14B illustrates a terminal procedure according to an embodiment of the disclosure.

Next, in the terminal procedure, a terminal may, in operation 1410, receive configuration information for one or multiple resources A from a base station. The terminal may, in operation 1411, receive scheduling information for a data channel from the base station. The terminal may, in operation 1412, receive an MCS change indicator from the base station. The terminal may, in operation 1413, determine whether to change an MCS for the data channel overlapping with resource region A, based on the contents of the MCS change indicator. If the MCS change indicator indicates MCS change, the terminal may, in operation 1414, perform MCS change for the data channel, and if the MCS change indicator does not indicate MCS change, the terminal may, in operation 1415, not change the MCS for the data channel and maintain an existing value as it is.

Fourth Embodiment

The fourth embodiment of the disclosure proposes a method of determining a transport block size (TBS), a method of determining a code block (CB), and a resource mapping method for a case where multiple MCSs applied to one data channel exist for each time or frequency resource with respect to the data channel.

The transport block size may be determined by a function of parameters such as a modulation order (Qm), a code rate (C), and the amount (NRE) of time and frequency resources used in data channel transmission. For example, same may follow the equation below.

$$TBS = Q_m \cdot C \cdot N_{RE}$$

The transport block may be configured by one or multiple code blocks. For example, when the transport block size is greater than a pre-defined threshold (Kcb), the transport block may be partitioned into multiple code blocks. For example, the number (Ncb) of code blocks configuring one transport block may be determined as below.

$$Ncb = \text{ceil}\left(\frac{TBS}{Kcb}\right)$$

In an embodiment of the disclosure, an MCS applied to a data channel may be different for each random time and frequency resource, and accordingly, multiple MCSs may be used in transmission of one data channel.

In an embodiment of the disclosure, an MCS may be the same or different for each part of the entire time and frequency resources in which a data channel is scheduled. Partial time and frequency resources to which different MCSs are applied are called "partial resources". Configuration information for the partial resource may be configured in advance by a base station for a terminal through higher layer signaling, or may be indicated by a base station to a terminal through L1 signaling.

In an embodiment of the disclosure, multiple MCSs may be applied to transmission of one data channel, and each MCS may be different for each partial resource that is pre-configured or indicated, among the entire resources in which the data channel is transmitted. In a specific example, in case that the entire resources in which a data channel is transmitted are configured by N partial resources, a maximum of N MCSs (i.e., MCSs, the number of which is equal to or smaller than N) may be applied and then the data channel may be transmitted.

In an embodiment of the disclosure, in case that multiple MCSs are applied to one data channel, the MCS may be applied in at least the unit of code block. That is, one code block may be modulated and coded based on one MCS. For example, in case that there are N code blocks configuring a transport block, the number of MCSs available for transmission of the transport block may not exceed N.

In an embodiment of the disclosure, after data bits are channel-coded and then modulated to be a complex signal, when a corresponding modulation symbol is mapped to actual physical time and frequency resources (or virtual time and frequency resources), the modulation symbol may be sequentially mapped to each partial resource, and more specifically, the modulation symbol may be mapped frequency-preferentially, time-secondarily (or time-preferentially, frequency-secondarily) in each partial resource.

More specifically, in case that M partial resources of partial resource #1, partial resource #2, . . . , and partial resource #M exist in the entire time and frequency resources in which a data channel is transmitted, modulation symbols may be mapped in the order from the lowest partial resource index to the highest (or in the order from the highest to the lowest). In addition, in case that a modulation symbol is mapped in random partial resource #X, and is mapped to an RE corresponding to the k-th subcarrier and the first symbol in random partial resource #X, the modulation symbol is preferentially mapped in the order in which the k index (frequency or subcarrier index) increases, and then is mapped in the order in which the first index (time or symbol index) increases. If mapping of modulation symbols is terminated with respect to all REs in partial resource #X, modulation symbols may be mapped to partial resource #X+1 in the same way. Until modulation symbol mapping for all partial resources are complete, the same mapping method may be repeated.

In an embodiment of the disclosure, in case that one data channel is transmitted using multiple MCSs, the size (TB-SMDT) of a transport block transmitted in the data channel may be determined by a function configured by parameters such as multiple modulation orders, multiple code rates, and the amount of resources configuring multiple partial resources. For example, in case that one TBS is configured by Ncb code blocks, a modulation order applied to the p-th code block is $Q_{m,p}$, a code rate applied to the p-th code block is Cp, and the amount of partial resources to which the p-th code block is mapped is NRE,p, the TBS may be determined by a function of Qm,p, Cp, and NRE,p. For example, same may follow the equation below.

$$TBS_{MDT} = \sum_{p=1}^{N_{cb}} Q_{m,p} \times C_p \times N_{RE,p}$$

In an embodiment of the disclosure, in case that one data channel is transmitted using multiple MCSs, a base station may determine a transport block, a code block, an MCS, a partial resource, and a modulation symbol mapping method, based on the above method, and may configure the data channel, based on the above embodiment, and transmit the data channel to a terminal or receive the data channel from the terminal. In addition, the base station may transmit, to the terminal, scheduling information (e.g., indication information for multiple MCSs, allocation information for a partial resource, etc.) for the data channel through a downlink control channel.

In an embodiment of the disclosure, in case that one data channel is transmitted using multiple MCSs, a terminal may determine a transport block, a code block, an MCS, a partial resource, and a modulation symbol mapping method, based on the above method, and may configure the data channel, based on the above embodiment, and transmit the data channel to a base station or receive the data channel from the base station. In addition, the terminal may receive, from the base station, scheduling information (e.g., indication information for multiple MCSs, allocation information for a partial resource, etc.) for the data channel through a downlink control channel, may obtain scheduling information for the data channel, based on received control information, and may control transmission or reception of the data channel, based on the information.

The embodiments of the disclosure described above may be carried out in combination.

In an embodiment of the disclosure described above, a method of dynamically changing an MCS may be replaced with a method of dynamically changing the size of transmission power (transmission power control), and the replaced method may be carried out in the same way. More specifically, an operation of changing MCS A to MCS B may be interpreted as an operation of changing the size of transmission power from transmission power A to transmission power B. Transmission power may correspond to the transmission power of a PDSCH transmitted by a base station to a terminal in a case of downlink, and may correspond to the transmission power of a PUSCH transmitted by a terminal to a base station in a case of uplink.

Fifth Embodiment

The fifth embodiment of the disclosure proposes a method for measuring interference between a downlink signal and an uplink signal or identifying an interference pattern in a particular time and frequency resource region (e.g., a resource region in which downlink and uplink are adjacent or overlap with each other) according to simultaneous occurrence of downlink transmission and uplink transmission by a base station in a state where downlink and uplink resource regions are adjacent or overlap with each other. For convenience of description of the disclosure, a resource region in which downlink and uplink resource regions are adjacent or overlap with each other is defined as "resource X". Interference which may be observed in resource X may mean interference affected by a downlink transmission signal to an uplink transmission signal, but the contents of the disclosure is not limited thereto. That is, interference which may be observed in resource X may include all of interference from downlink to uplink, interference from uplink to downlink, or link interference which may occur in a situation where it is unclear whether the signal is uplink or downlink. In the disclosure, the interference is named self-interference.

In an embodiment of the disclosure, a base station may be pre-learn and secure an interference pattern corresponding to scheduling information (e.g., time and frequency resource allocation information, transmission power information, MCS information, etc.) of physical layer channels through training in order to determine the amount (or interference pattern) of self-interference in resource X. For example, in case that self-interference corresponds to interference from downlink transmission to uplink reception, a base station may secure, through pre-training, information indicating how much downlink transmission interferes in uplink reception with respect to a combination of all or some of schedulings available for a downlink channel (e.g., a combination related to all time and frequency resource allocation, a combination related to transmission power, a combination related to an MCS, etc.). For example, in case that a combination of schedulings available for a downlink channel is {scheduling information #1, scheduling information #2, . . . , and scheduling information #N}, a base station may assume downlink transmission, based on scheduling information #1 and measure a self-interference amount to obtain information of self-interference #1. Similarly, the base station may pre-obtain information of self-interference #2 based on scheduling information #2, self-interference #3 based on scheduling information #3, . . . , and self-interference #N based on scheduling information #N. The self-interference may correspond to interference which may be observed in resource X. As described above, the base station may pre-learn and secure the amount or the pattern information of self-interference of a possible combination corresponding to downlink scheduling. In order to pre-secure the amount or the pattern information of self-interference, a machine learning algorithm, a deep learning algorithm, or an artificial intelligence-based algorithm similar thereto may be used. The base station may adaptively control uplink scheduling, based on the secured information for an interference pattern. The first embodiment to the fourth embodiment may be performed.

According to the fifth embodiment of the disclosure, the base station may determine the amount of interference incurred by a downlink signal in a time and frequency resource region in which uplink transmission is performed, and differently control scheduling of an uplink data channel in consideration of the amount of interference.

The (5-1)th Embodiment

In some embodiments of the disclosure, a base station may configure all or some of resources (e.g., uplink resources) affected by self-interference to be one or multiple resources X, based on an interference pattern for a learned amount of self-interference. For example, all or some of uplink resources may be configured by resources X corresponding to a total of M subbands, for example, {subband #1, subband #2, . . . , and subband #M}, and M self-interference amounts, for example, {self-interference amount #1, self-interference amount #2, . . . , and self-interference amount #M} may be mapped to resources X corresponding to the respective subbands. Each self-interference amount #N may be a self-interference amount measured in an uplink resource region correspond to subband #N. The base station may determine the MCS or the transmission power value of an uplink data channel scheduled to include random subband #N in consideration of self-interference amount #N pre-measured in corresponding subband #N when calculating same.

The base station may configure or indicate, for or to a terminal, information for the subband and information for a self-interference amount in each subband through higher layer signaling or L1 signaling. The terminal may differently control a parameter (e.g., MCS or transmission power value) for a scheduled data channel, based on configuration information for the subband and the self-interference amount configured by the base station.

The (5-2)th Embodiment

In an embodiment of the disclosure, a base station may be pre-learn and secure an interference pattern corresponding to scheduling information (e.g., time and frequency resource allocation information, transmission power information, MCS information, etc.) of physical layer channels through training in order to determine the amount (or interference pattern) of self-interference in resource X. For example, in case that self-interference corresponds to interference from downlink transmission to uplink reception, a base station may secure, through pre-training, information indicating how much downlink transmission interferes in uplink reception with respect to a combination of all or some of schedulings available for a downlink channel (e.g., a combination related to all time and frequency resource allocation, a combination related to transmission power, a combination related to an MCS, etc.).

For the purpose of lowering learning complexity, all or some pieces of scheduling information for a downlink channel may be grouped, and learning may be performed in the unit of groups. For example, similar pieces of scheduling information among all pieces of scheduling information for the entire downlink channels may be grouped as one scheduling information group. For example, in case that there are a total of four pieces of scheduling information {scheduling information #1, scheduling information #2, scheduling information #3, and scheduling information #4}, they are grouped into scheduling group #1={scheduling information #1 and scheduling information #2} and scheduling group #2={scheduling information #3 and scheduling information #4}. The base station may learn a self-interference amount in the unit of scheduling groups, and obtain information for a self-interference amount in resource X, based on corresponding information. For example, in case that there are M scheduling groups, that is, {scheduling group #1, scheduling group #2, scheduling group #3, . . . , and scheduling group #M}, M self-interference amounts learned in respective scheduling groups, that is, (self-interference amount #1, self-interference amount #2, . . . , and self-interference amount #M), may be obtained.

In an embodiment of the disclosure, in order to predict a self-interference amount according to scheduling information of a downlink channel in random resource X, the base station may use the above scheduling groups and self-interference amount information corresponding to each scheduling group. For example, if scheduling information of a downlink channel corresponds to scheduling information #1, and scheduling information #1 belongs to scheduling group #1, a terminal may consider a self-interference amount as self-interference amount #1. That is, the base station may quantize downlink scheduling information and map the quantized downlink scheduling information to a scheduling group, and consider a self-interference amount associated with the scheduling group as a self-interference amount in resource X. Therefore, a learning amount for obtaining information for an interference pattern may be effectively reduced.

In an embodiment of the disclosure, scheduling information may include, for example, an MCS of a downlink channel, a transmission power, time and frequency resource allocation information, precoding information, beam, TCI state, or QCL-related information, etc.

In a detailed example, a base station may divide all or some downlink resources into one or multiple subbands, and consider each subband as a scheduling group. For example, {subband #1, subband #2, . . . , and subband #M} may be mapped to {scheduling group #1, scheduling group #2, . . . , and scheduling group #M}, respectively. All pieces of scheduling information relating to a downlink channel being mapped in a resource region corresponding to subband #N may be considered to correspond to scheduling group #N. That is, resource allocation information of a downlink channel may be quantized in the unit of subbands and then be mapped to each scheduling group. The base station may obtain information for an interference pattern by pre-learning a self-interference amount for each scheduling group. Accordingly, the base station may consider that a self-interference amount has occurred by self-interference #1 for a downlink channel, the resources for which are allocated in subband #1, and may consider that a self-interference amount has occurred by self-interference #2 for a downlink channel, the resources for which are allocated in subband #2. The base station may determine a self-interference amount affecting an uplink channel, based on scheduling information of a downlink channel, and differently adjust scheduling of an uplink channel accordingly.

The (5-3)th Embodiment

Figure 15:
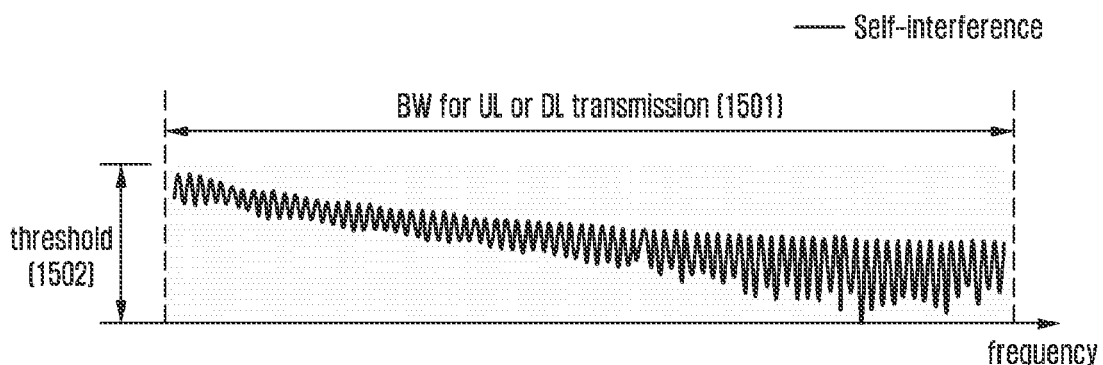
FIG. 15 illustrates a bandwidth for self-interference of a downlink signal or an uplink signal according to an embodiment of the disclosure.

FIG. 15 illustrates a bandwidth for self-interference of a downlink signal or an uplink signal according to an embodiment of the disclosure.

Referring to FIG. 15, in some embodiments of the disclosure, a base station may determine a self-interference amount in resource X or an interval in which an MCS is distinguished, through experimental values/simulation. For example, through experiment and simulation, in case that resources (e.g., uplink resources) affected by self-interference are determined to have a particular threshold 1502 in a particular bandwidth 1501, when self-interference equal to or greater than the threshold is measured, the base station may configure all or some of the resources to be one or multiple resources X. The base station may adaptively control uplink scheduling, based on the secured interference information. The first embodiment to the fourth embodiment may be performed. For example, in case that self-interference is greater than the threshold 1502, a low MCS may be determined to be used. In case that self-interference is smaller than the threshold 1502, a high MCS may be determined to be used.

The (5-4)th Embodiment

In some embodiments of the disclosure, a base station may determine a self-interference amount in resource X or an interval in which an MCS is distinguished, according to a particular rule. In some embodiments of the disclosure, a base station may assign a weight to each band, and multiply self-interference measured in a particular band by the weight to configure all or some of resources (e.g., uplink resources) affected by self-interference to be one or multiple resources X.

The embodiments of the disclosure described above may be carried out in combination.

Figure 16:
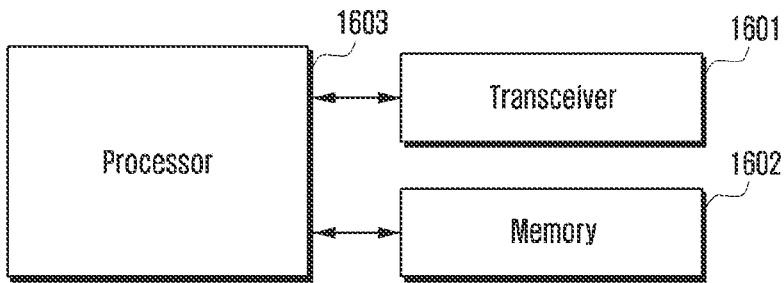
FIG. 16 is a block diagram showing an internal structure of a terminal according to an embodiment of the disclosure.

FIG. 16 is a block diagram showing an internal structure of a terminal according to an embodiment of the disclosure.

Referring to FIG. 16, a terminal may include a transceiver 1601, a memory 1602, and a processor 1603. The elements of the terminal are not limited to the above example. For example, the terminal may include more or fewer elements than the above elements. In addition, at least one or all of the transceiver 1601, the memory 1602, and the processor 1603 may be implemented into a single chip.

In an embodiment, the transceiver 1601 may transmit or receive a signal to or from a base station. The described signal may include control information and data. To this end, the transceiver 1601 may include an RF transmitter that up-converts and amplifies a frequency of a transmitted signal, an RF receiver that low-noise amplifies a received signal and down-converts the frequency, and the like. In addition, the transceiver 1601 may receive a signal through a wireless channel and output the signal to the processor 1603, and may transmit a signal output from the processor 1603, through a wireless channel.

In an embodiment, the memory 1602 may store a program and data required for an operation of the terminal. In addition, the memory 1602 may store control information or data included in a signal transmitted or received by the terminal. The memory 1602 may be configured by a storage medium such as ROM, RAM, hard disk, CD-ROM, and DVD, or a combination of storage mediums. In addition, the memory 1602 may include a plurality of memories. According to an embodiment, the memory 1602 may store a program for executing an operation for power saving of the terminal.

In an embodiment, the processor 1603 may control a series of processes in which the terminal may operate according to embodiments of the disclosure described above. In an embodiment, the processor 1603 may execute a program stored in the memory 1602 to receive, from a base station, information, such as a configuration for CA, a bandwidth part configuration, an SRS configuration, a PDCCH configuration, etc., and control a dormant cell management operation, based on configuration information.

Figure 17:
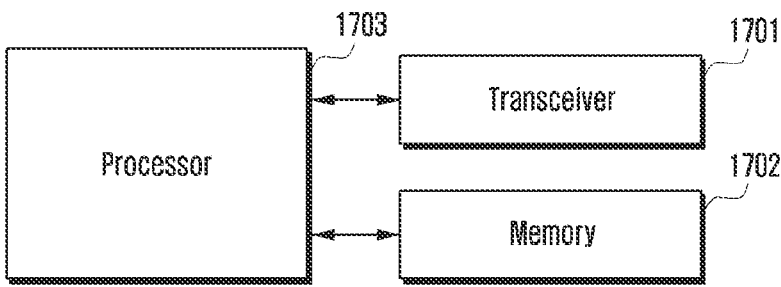
FIG. 17 is a block diagram showing an internal structure of a base station according to an embodiment of the disclosure.

FIG. 17 is a block diagram showing an internal structure of a base station according to an embodiment of the disclosure.

Referring to FIG. 17, the base station may include a transceiver 1701, a memory 1702, and a processor 1703. However, the elements of the base station are not limited to the above example. For example, the terminal may include more or fewer elements than the above elements. In addition, the transceiver 1701, the memory 1702, and the processor 1703 may be implemented into a single chip.

In an embodiment, the transceiver 1701 may transmit or receive a signal to or from a terminal. The described signal may include control information and data. To this end, the transceiver 1701 may include an RF transmitter that up-converts and amplifies a frequency of a transmitted signal, an RF receiver that low-noise amplifies a received signal and down-converts the frequency, and the like. In addition, the transceiver 1701 may receive a signal through a wireless channel and output the signal to the processor 1703, and may transmit a signal output from the processor 1703, through a wireless channel.

In an embodiment, the memory 1702 may store a program and data required for an operation of the terminal. In addition, the memory 1702 may store control information or data included in a signal transmitted or received by the terminal. The memory 1702 may be configured by a storage medium such as ROM, RAM, hard disk, CD-ROM, and DVD, or a combination of storage mediums. In addition, the memory 1702 may include a plurality of memories. According to an embodiment, the memory 1702 may store a program for executing an operation for power saving of the terminal.

In an embodiment, the processor 1703 may control a series of processes in which the base station may operate according to embodiments of the disclosure described above. In an embodiment, the processor 1703 may execute a program stored in the memory 1702 to transmit, to a terminal, information, such as a configuration for CA, a bandwidth part configuration, an SRS configuration, a PDCCH configuration, etc., and control a dormant cell operation of the terminal, based on configuration information.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Further, the above respective embodiments may be employed in combination, as necessary. For example, a part of one embodiment of the disclosure may be combined with a part of another embodiment to operate a base station and a terminal. Further, the embodiments of the disclosure may be applied to other communication systems, and other variants based on the technical idea of the embodiments may also be implemented. For example, the embodiments may be applied to LTE, 5G, NR, or other systems.

The invention claimed is:

1. A method performed by a terminal of a communication system, the method comprising:
    receiving, from a base station, downlink control information including modulation and coding scheme (MCS) information indicating an MCS index and resource information of a data channel indicating a resource of the data channel;
    obtaining a first MCS value based on the MCS index and a first MCS table, the first MCS table being for a first resource included in the resource of the data channel;
    obtaining a second MCS value based on the MCS index and a second MCS table, the second MCS table being for a second resource included in the resource of the data channel; and
    transmitting or receiving the data channel, based on the first MCS value and the second MCS value, wherein the first MCS value is applied to the first resource and the second MCS value is applied to the second resource.

2. The method of claim 1, further comprising:
    receiving, from the base station, information on the first MCS table and the second MCS table.

3. The method of claim 1, wherein each of the first MCS table and the second MCS table corresponds to an MCS sub-table that includes part of entries of an entire MCS table.

4. The method of claim 1, wherein a low self-interference is applied to the first resource and a high self-interference is applied to the second resource, or
    wherein the first resource is a resource of the data channel, which does not overlap with another resource, and the second resource is a resource of the data channel, which overlaps with the other resource.

5. A method performed by a base station of a communication system, the method comprising:
    identifying a resource of a data channel;
    obtaining a first modulation and coding scheme (MCS) value for a first resource included in the resource of the data channel and a second MCS value for a second resource included in the resource of the data channel;
    transmitting, to a terminal, downlink control information including MCS information indicating an MCS index and resource information of the data channel indicating the resource of the data channel; and
    receiving or transmitting the data channel, based on the first MCS value and the second MCS value,
    wherein the first MCS value is indicated by the MCS index based on a first MCS table for the first resource and the second MCS value is indicated by the MCS index based on a second MCS table for the second resource, and wherein the first MCS value is applied to the first resource and the second MCS value is applied to the second resource.

6. The method of claim 5, further comprising:

transmitting, to the terminal, information on the first MCS table and the second MCS table.

7. The method of claim 5, wherein each of the first MCS table and the second MCS table corresponds to an MCS sub-table that includes part of entries of an entire MCS table.

8. The method of claim 5, wherein a low self-interference is applied to the first resource, and a high self-interference is applied to the second resource, or wherein the first resource does not overlap with another resource, and the second resource overlaps with the other resource.

9. A terminal in a communication system, the terminal comprising:

a transceiver; and a controller configured to:

receive, from a base station, downlink control information including modulation and coding scheme (MCS) information indicating an MCS index and resource information of a data channel indicating a resource of the data channel, obtain a first MCS value based on the MCS index and a first MCS table, the first MCS table being for a first resource included in the resource of the data channel, obtain a second MCS value based on the MCS index and a second MCS table, the second MCS table being for a second resource included in the resource of the data channel, and transmit or receive the data channel, based on the first MCS value and the second MCS value, wherein the first MCS value is applied to the first resource and the second MCS value is applied to the second resource.

10. The terminal of claim 9, further comprising:

receiving, from the base station, information on the first MCS table and the second MCS table.

11. The terminal of claim 9, wherein each of the first MCS table and the second MCS table corresponds to an MCS sub-table that includes part of entries of an entire MCS table.

12. The terminal of claim 9, wherein a low self-interference is applied to the first resource and a high self-interference is applied to the second resource, or wherein the first resource is a resource of the data channel, which does not overlap with another resource, and the second resource is a resource of the data channel, which overlaps with the other resource.

13. A base station of a communication system, the base station comprising:

a transceiver; and a controller configured to:

identify a resource of a data channel, obtain a first modulation and coding scheme (MCS) value for a first resource included in the resource of the data channel and a second MCS value for a second resource included in the resource of the data channel, transmit, to a terminal, downlink control information including MCS information indicating an MCS index and resource information of the data channel indicating the resource of the data channel, and receive or transmit the data channel, based on the first MCS value and the second MCS value, wherein the first MCS value is indicated by the MCS index based on a first MCS table for the first resource and the second MCS value is indicated by the MCS index based on a second MCS table for the second resource, and the first MCS value is applied to the first resource and the second MCS value is applied to the second resource.

14. The base station of claim 13, wherein further comprising:

transmitting, to the terminal, information on the first MCS table and the second MCS table.

15. The base station of claim 13, wherein a low self-interference is applied to the first resource and a high self-interference is applied to the second resource, or wherein the first resource does not overlap with another resource, and the second resource overlaps with the other resource.

16. The base station of claim 13, wherein each of the first MCS table and the second MCS table corresponds to an MCS sub-table that includes part of entries of an entire MCS table.

* * * * *